United States Patent
Ayala et al.

(10) Patent No.: US 10,541,712 B1
(45) Date of Patent: Jan. 21, 2020

(54) ENHANCED PASSIVE INTERMODULATION DETECTION IN WIRELESS NETWORKS

(71) Applicant: Spectrum Effect Inc., Kirkland, WA (US)

(72) Inventors: Diego Ayala, Kirkland, WA (US); Eamonn Gormley, Kirkland, WA (US); David James Ryan, Kirkland, WA (US); Charles Immendorf, Kirkland, WA (US); Rekha Menon, Kirkland, WA (US)

(73) Assignee: SPECTRUM EFFECT INC., Kirkland, WA (US)

( * ) Notice: Subject to any disclaimer, the term of this patent is extended or adjusted under 35 U.S.C. 154(b) by 0 days.

(21) Appl. No.: 16/422,888

(22) Filed: May 24, 2019

Related U.S. Application Data

(63) Continuation-in-part of application No. 16/389,846, filed on Apr. 19, 2019, which is a continuation-in-part of application No. 16/179,683, filed on Nov. 2, 2018.

(51) Int. Cl.
*H04B 1/10* (2006.01)
*H04B 17/345* (2015.01)

(52) U.S. Cl.
CPC ......... *H04B 1/1027* (2013.01); *H04B 17/345* (2015.01)

(58) Field of Classification Search
CPC ... H04W 24/08; H04W 52/243; H04W 52/42; H04W 52/52; H04W 88/08; H04B 17/102; H04B 17/345; H04B 15/00; H04B 15/02; H04B 17/0085; H04B 17/104; H04B 17/11; H04B 17/21; H04B 17/318; H04B 17/3912; H04B 1/0458; H04B 1/0466; H04B 1/0475; H04B 1/1027; H04B 1/109; H04B 7/024
See application file for complete search history.

(56) References Cited

U.S. PATENT DOCUMENTS

| | | | | |
|---|---|---|---|---|
| 10,009,784 | B1 * | 6/2018 | Evircan | H04W 24/08 |
| 2015/0350940 | A1 * | 12/2015 | Wilson | H04W 24/08 370/252 |
| 2016/0366605 | A1 * | 12/2016 | Tsui | H04W 24/08 |
| 2017/0041125 | A1 * | 2/2017 | Ko | H04W 52/52 |
| 2018/0152253 | A1 * | 5/2018 | Bell | C09J 7/38 |
| 2019/0007078 | A1 * | 1/2019 | Tsui | H04B 1/109 |

* cited by examiner

*Primary Examiner* — Golam Sorowar

(57) ABSTRACT

Interference caused by passive intermodulation (PIM) can be automatically detected at receivers in a wireless telecommunications network, and the accuracy of PIM detection can be increased by de-weighting or ignoring time slots in which non-PIM interference is detected at a target receiver.

13 Claims, 10 Drawing Sheets

FIG. 3

Table 1: Generated mixing products of order 2 and 3 for two single-tone signals

| Mixing Order | | Mixing Products |
|---|---|---|
| $(S_1 + S_2)^2$ | $2f_1, 2f_2$ | $\frac{1}{2}A_1^2\cos(4\pi f_1 t) + \frac{1}{2}A_2^2\cos(4\pi f_2 t)$ |
| | $f_1 - f_1, f_2 - f_2$ | $\frac{1}{2}(A_1^2 + A_2^2)$ |
| | $f_1 + f_2, f_1 - f_2$ | $A_1 A_2 \cos(2\pi(f_1 + f_2)t) + A_1 A_2 \cos(2\pi(f_1 - f_2)t)$ |
| $(S_1 + S_2)^3$ | $3f_1, 3f_2$ | $\frac{1}{4}A_1^3 \cos(6\pi f_1 t) + \frac{1}{4}A_2^3 \cos(6\pi f_2 t)$ |
| | $2f_1 - f_1, 2f_2 - f_2$ | $\left(\frac{3}{4}A_1^3 + \frac{3}{2}A_1 A_2^2\right)\cos(2\pi f_1 t) + \left(\frac{3}{4}A_2^3 + \frac{3}{2}A_1^2 A_2\right)\cos(2\pi f_2 t)$ |
| | $2f_1 + f_2, 2f_1 - f_2$ | $\frac{3}{4}A_1^2 A_2 \cos(2\pi(2f_1 + f_2)t) + \frac{3}{4}A_1^2 A_2 \cos(2\pi(2f_1 - f_2)t)$ |
| | $f_1 + 2f_2, f_1 - 2f_2$ | $\frac{3}{4}A_1 A_2^2 \cos(2\pi(f_1 + 2f_2)t) + \frac{3}{4}A_1 A_2^2 \cos(2\pi(f_1 - 2f_2)t)$ |

FIG. 4

Table 2: Prefactors $\delta n$ for computing effective bandwidth

| Mixing Order | 2 | 3 | 4 | 5 | 6 | 7 |
|---|---|---|---|---|---|---|
| $\delta_n$ | 1.0 | 0.97 | 0.91 | 0.84 | 0.78 | 0.73 |

FIG. 5

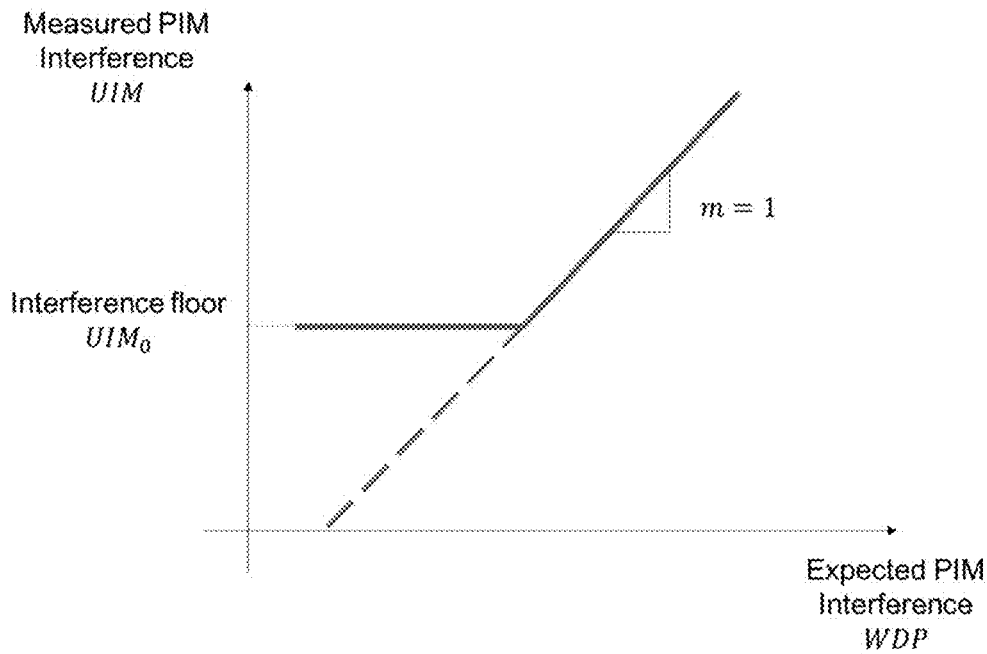

FIG. 6

Table 3: Parameters stored in long term retention database

| Parameter | Description |
|---|---|
| $n, f_I, \Delta f_I$ | Order, center frequency and bandwidth of the intermodulation mixing product. |
| $\alpha_1, \ldots, \alpha_K$ | Mixing multipliers. Only non-zero multipliers are stored. |
| $f_{DL}^{(1)}, \ldots, f_{UL}^{(K)}$ | Downlink frequencies corresponding to non-zero mixing multipliers. |
| $c^{(1)}, \ldots, c^{(M)}$ | List of contributing cells, grouped by downlink channel. |
| $\kappa_{UL}$ | Percentage of uplink channel of focus cell impacted by mixing product. |

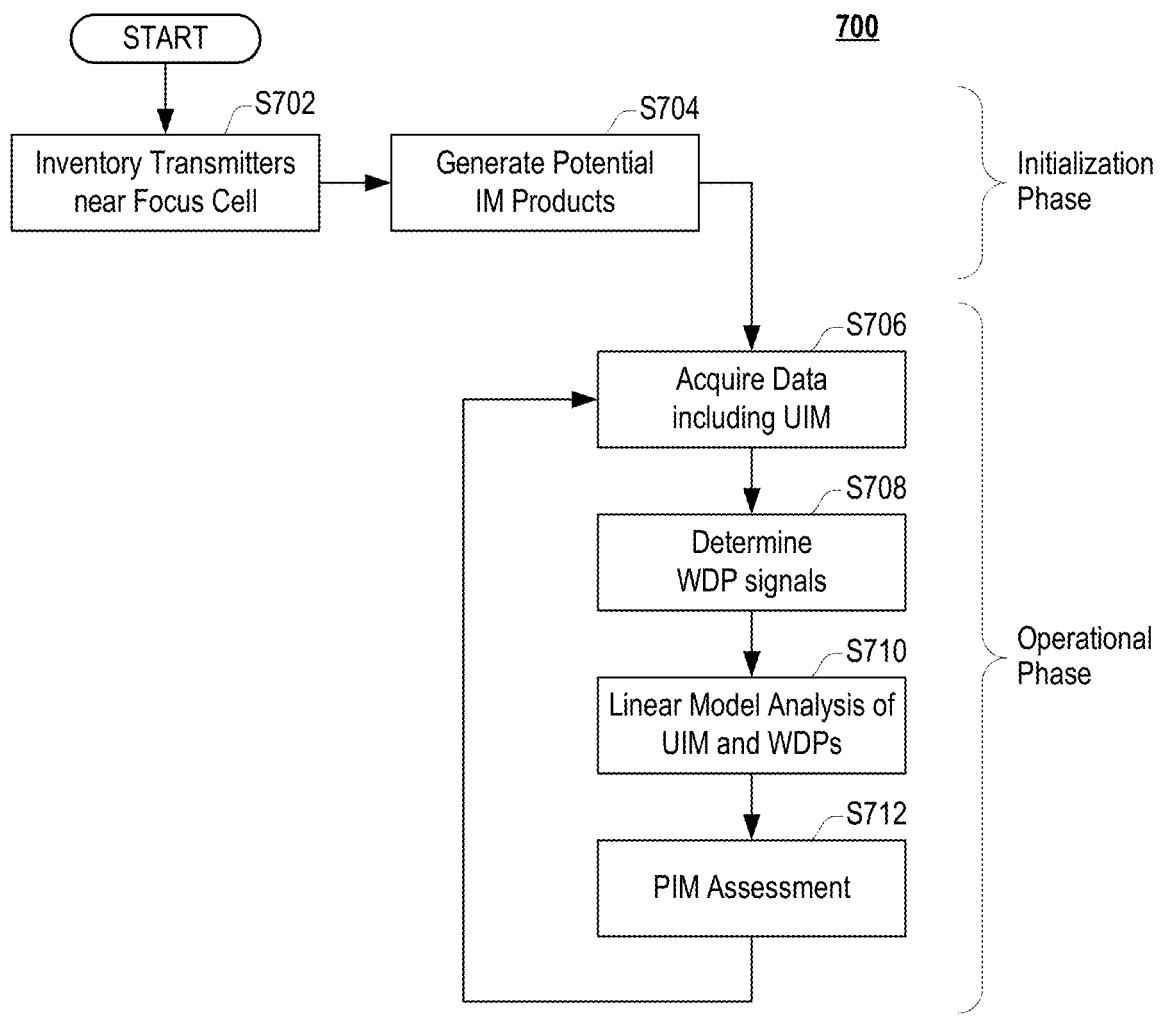

FIG. 7

FIG. 10
Table 4: Thresholds for PIMDA

| Threshold name | Value |
|---|---|
| $ThreshSlope_{glob}$ | $\mu_G + \sigma_G$ |
| $ThreshSlope_{high}$ | $\mu_{hi} + \sigma_{hi}$ |
| $ThreshSlope_{nonDecr}$ | $0.25 \cdot \text{average}(slope_{HIGH})$ |
| $\delta UIMThresh_{low}$ | 3 dB |
| $\delta UIMThresh_{high}$ | 3 dB |
| $floorUIMThresh_{high}$ | $\mu_{floor} + 1.5$ dB |

FIG. 11
Table 5: Example feature weights $\gamma_i$ for PIM score computation

| Feature | $\gamma$ |
|---|---|
| Increasing slope | 5/32 |
| Increasing spread | 0/32 |
| Large global slope | 3/32 |
| Large slope high traffic | 5/32 |
| Non-decreasing slope | 5/32 |
| Small $\delta UIM$ | 3/32 |
| Large $\delta UIM$ | 3/32 |
| Large $UIM$ floor | 5/32 |
| Slope relative to PIM | 3/32 |

FIG. 12

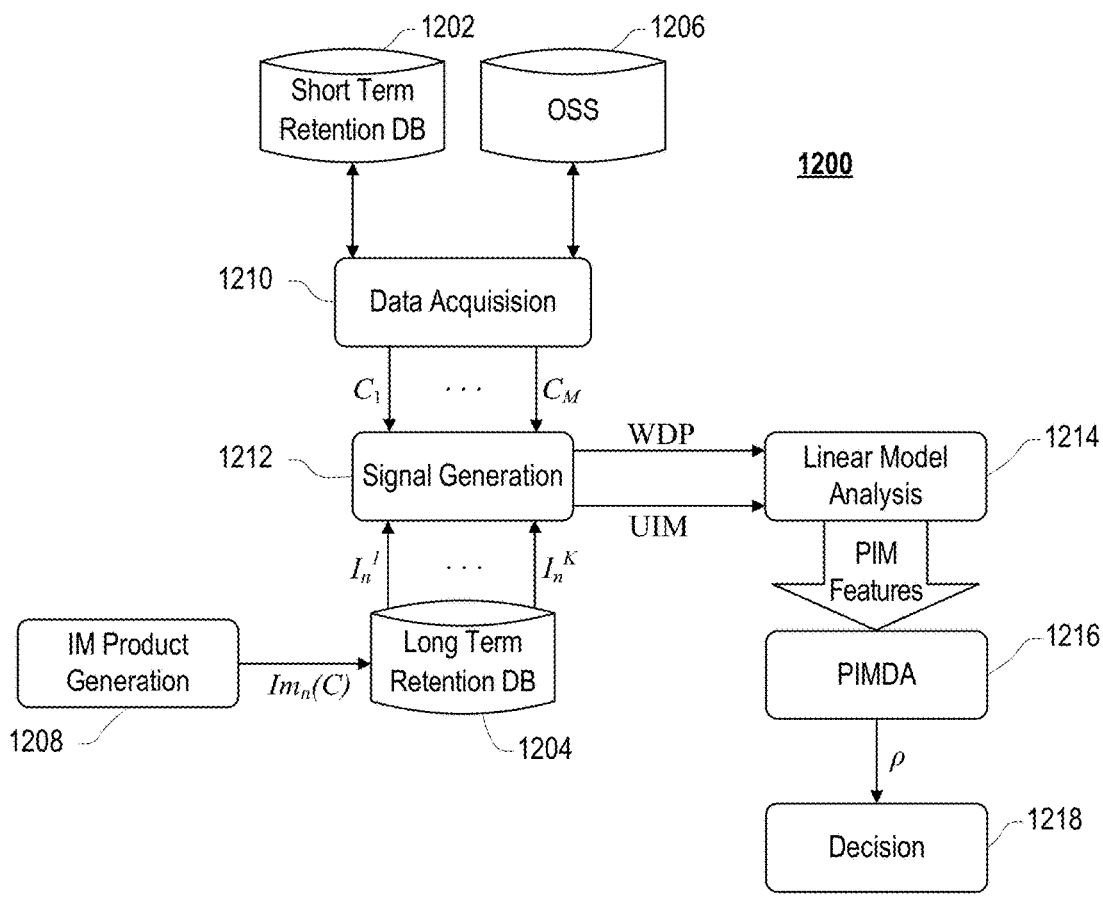

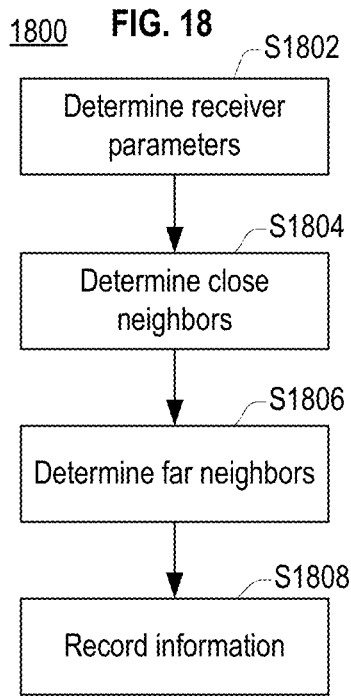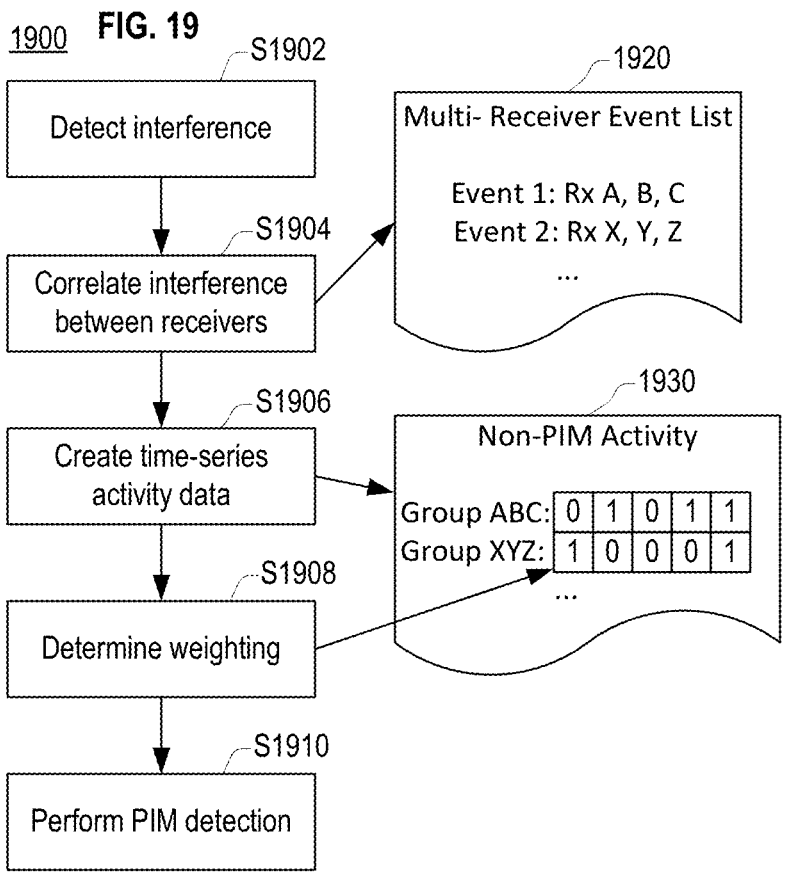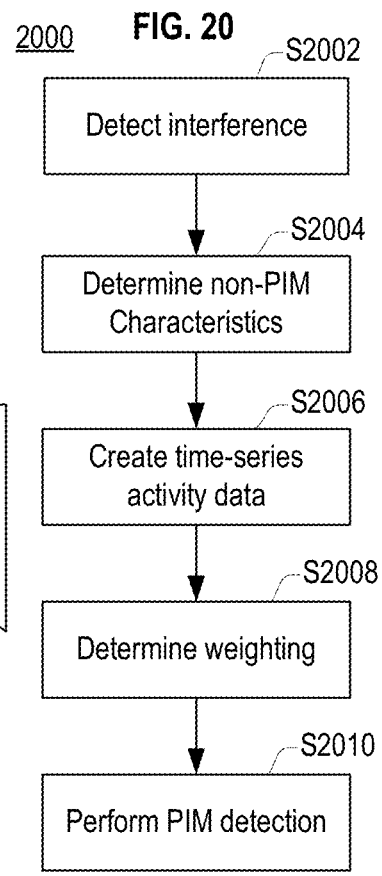

ENHANCED PASSIVE INTERMODULATION DETECTION IN WIRELESS NETWORKS

CROSS-REFERENCES TO RELATED APPLICATIONS

This application is a continuation-in-part of U.S. application Ser. No. 16/389,846, filed Apr. 19, 2019, which is a continuation-in-part of U.S. application Ser. No. 16/179,683, filed April Nov. 2, 2018, which are incorporated by reference herein.

BACKGROUND

Modern wireless communications systems operate in environments where signal quality to and from end-user devices is limited by interference coming from diverse sources. A wireless communication system may experience unexpected network interference originating from intentional and/or unintentional RF generating sources. These potential interference sources include other users served by the same or nearby base stations, industrial machinery, electronic test equipment radiating signals in the bands of interest, undesired mixing products generated by the wireless communication system, and illegal radio sources operating in the wrong frequency bands. The presence of these interference sources results in degraded system service and reduced wireless network capacity coverage as the intentional system signals suffer degradation due to these interferers.

Passive Inter-Modulation (PIM) may occur when one or more signals encounter a non-linear medium. For a single signal, PIM may generate new signals (hereinafter called PIM signals) with frequencies that are an integer multiple of the original frequencies of the signal. For two or more signals, the PIM may generate PIM signals having frequencies equal to sums of the frequencies of the two or more signals, differences of the frequencies of the two or more signals, and combinations thereof. As a result, the PIM signals may interfere with signals having frequencies other than the frequencies of the signals that caused the PIM signals to occur.

Non-linear media that generate PIM include ferromagnetic materials, corroded metal parts, and mis-joined connectors. For example, a rusted metal strut or a corroded electrical connector may generate PIM signals. Accordingly, the effects of time and exposure to the elements can cause PIM to occur and increase in items that when new and properly installed did not generate significant amounts of PIM.

Traditional methods for PIM detection involve manual on-site inspections which require intentionally disabling transmitting equipment and the generation of test signals. Manual inspections require turning off the revenue-generating network equipment and deploying personnel into the field, often at off-peak hours such as the middle of the night. Accordingly, manual inspections incur high costs and result in service interruptions.

Operators of communication system, especially wireless communications systems that operate over wide areas, may monitor their installations to detect new or increased levels of PIM that may cause unacceptable levels of interference. Conventional approaches to detecting PIM involve deploying technicians to base station sites to perform manual testing as described above, which is expensive, time consuming, and causes service interruptions. To reduce the cost of operating the communication system and improve its reliability, it would be advantageous to detect the existence of new or increased levels of PIM: 1) automatically, 2) without interfering with or interrupting the operation of the communication system, 3) without specialized signal generation equipment, and 4) without having technicians present at the installations where the interference caused by PIM is being received.

Interference caused by PIM affects frequencies that are different from frequencies that trigger the PIM interference, and in some cases a portion of the frequencies affected by PIM interference are used by a co-sited cell. In some installations, co-sited cells are operated by different operators which are generally market competitors, so that transmissions from one operator can cause interference that affects a different operator. Multiple types of interference affect frequencies and times that are used by different operators. In addition, non-PIM external interference can compromise the accuracy of PIM detection.

TECHNICAL FIELD

The present disclosure relates to determining a system and method for external interference in a wireless telecommunications network. Specific embodiments relate to detecting and resolving PIM interference, determining external interference that is not PIM interference, and improving the accuracy of PIM interference detection by accounting for the external interference that is not PIM.

BRIEF SUMMARY

This disclosure describes automated processes for detecting PIM interference in a wireless network. A system and method according to embodiments determine time slots during which external interference that is not caused by PIM is affecting a target receiver, and adapt PIM interference detection parameters accordingly. The non-PIM interference may be detected at the target receiver alone, or may be detected by determining that characteristics of the interference are correlated between multiple receivers separated by distance.

This disclosure describes methods of securely sharing information between automated interference detection tools such that information to support accurate detection of PIM interference is exchanged, while an operator's proprietary information is not publicly visible to competitive network operators. Some embodiments are directed to an automated system for detecting external interference at shared cell sites that utilizes unique data encryption or data obfuscation keys to individual operators and an interference detection system that is able to decrypt and utilize each supplied data stream to detect and characterize external interference in a wireless network.

This disclosure describes techniques to detect the generation of Passive Inter-Modulation (PIM)-caused interference in or near a wireless receiver without the use of special-purpose test signals. In particular, embodiments include a system that receives signals in a frequency band and performs analysis on the received signals to detect PIM signals generated by two or more transmissions from nearby or shared-infrastructure wireless transmitters in the ordinary course of their operation. Embodiments may be applied to a wireless communication system to detect PIM-generating conditions without having to interrupt the normal operation of the wireless communication system, without reconfiguring the wireless communication system, and remotely—that is, without the presence of technicians at or near the site where the PIM is detected. As a result, embodiments reduce the cost and increase the speed of detecting PIM in the presence of PIM-generating conditions.

In an embodiment, a method for remote detection of interference generated by Passive Inter-Modulation (PIM) comprises: determining intermodulation product information for a plurality of transmitters, receiving downlink power information of the plurality of transmitters, determining, using the intermodulation product information and the downlink power information, a Weighted Downlink Power (WDP) signal for an intermodulation product, and determining, using the WDP signal, a PIM Detection Assessment (PIMDA) score of the intermodulation product, wherein a value of the PIMDA score corresponds to interference generated by PIM.

In an embodiment, a wireless telecommunications system comprises a receiver and a processor. The wireless telecommunications system is configured to perform, using the processor: determining intermodulation product information for a plurality of transmitters, receiving downlink power information of the plurality of transmitters, determining, using the intermodulation product information and the downlink power information, a Weighted Downlink Power (WDP) signal for an intermodulation product, and determining, using the WDP signal, a PIM Detection Assessment (PIMDA) score of the intermodulation product, wherein a value of the PIMDA score corresponds to interference generated by PIM.

Embodiments of the present disclosure include a non-transitory computer-readable medium with computer-executable instructions stored thereon which, when executed by a processor, performs one or more of the steps described above.

BRIEF DESCRIPTION OF THE DRAWINGS

FIG. 3 includes a table showing mixing products for order 2 and 3 for two single toned signals.

FIG. 4 includes a table of illustrative values of a bandwidth pre-factor $\delta_n$ for determining an effective bandwidth of a PIM-caused signal, according to an embodiment.

FIG. 5 illustrates a relationship between expected PIM-caused interference and measured PIM-caused interference in an embodiment.

FIG. 6 includes a table summarizing information stored in a database for each of one or more intermodulation products $I_n$, according to an embodiment.

FIG. 7 illustrates a process for detecting PIM-caused interference at a focus cell, according to an embodiment.

FIG. 10 includes a table showing illustrative thresholds used in determining a PIMDA score, according to an embodiment.

FIG. 11 includes a table showing illustrative feature weights for use in determining a PIMDA score, according to an embodiment.

FIG. 12 illustrates a system for detection of PIM-caused interference, according to an embodiment.

FIG. 18 illustrates an embodiment of a process for configuring a PIM detection system.

FIG. 19 illustrates an embodiment of performing PIM detection in view of correlated interference.

FIG. 20 illustrates an embodiment of performing PIM detection in view of non-PIM characteristics of a target receiver.

DETAILED DESCRIPTION

A detailed description of embodiments is provided below along with accompanying figures. The scope of this disclosure is limited only by the claims and encompasses numerous alternatives, modifications, and equivalents. Although steps of various processes are presented in a particular order, embodiments are not necessarily limited to being performed in the listed order. In some embodiments, certain operations may be performed simultaneously, in an order other than the described order, or not performed at all.

Numerous specific details are set forth in the following description in order to provide a thorough understanding. These details are provided for the purpose of example and embodiments may be practiced according to the claims without some or all of these specific details. For the sake of clarity, technical material that is known in the technical fields related to this disclosure has not been described in detail so that the disclosure is not unnecessarily obscured.

Embodiments of the present disclosure represent a number of improvements to existing wireless communication technology. Embodiments allow detection of PIM-caused interference without the use of special test equipment. Embodiments allow detection of PIM-caused interference at geographically remote sites without the need to send technicians to those sites. Embodiments allow detection of PIM-caused interference without the need to take the components being subjected to the PIM-caused interference out of active service. Embodiments allow detection of PIM-caused interference inexpensively and on a regular schedule without disrupting the operation of the communication system in which the detection is being performed.

Embodiments of the present disclosure are especially well suited to detecting interference caused by PIM remotely in wireless telecommunication systems that are spread out over a large geographical area, where dispatching technicians to remote and at times difficult to access sites to perform PIM interference detection would be expensive or impractical, and where taking system components out of service to perform PIM interference testing might result in a loss of service in areas covered by the system.

Figure 1:
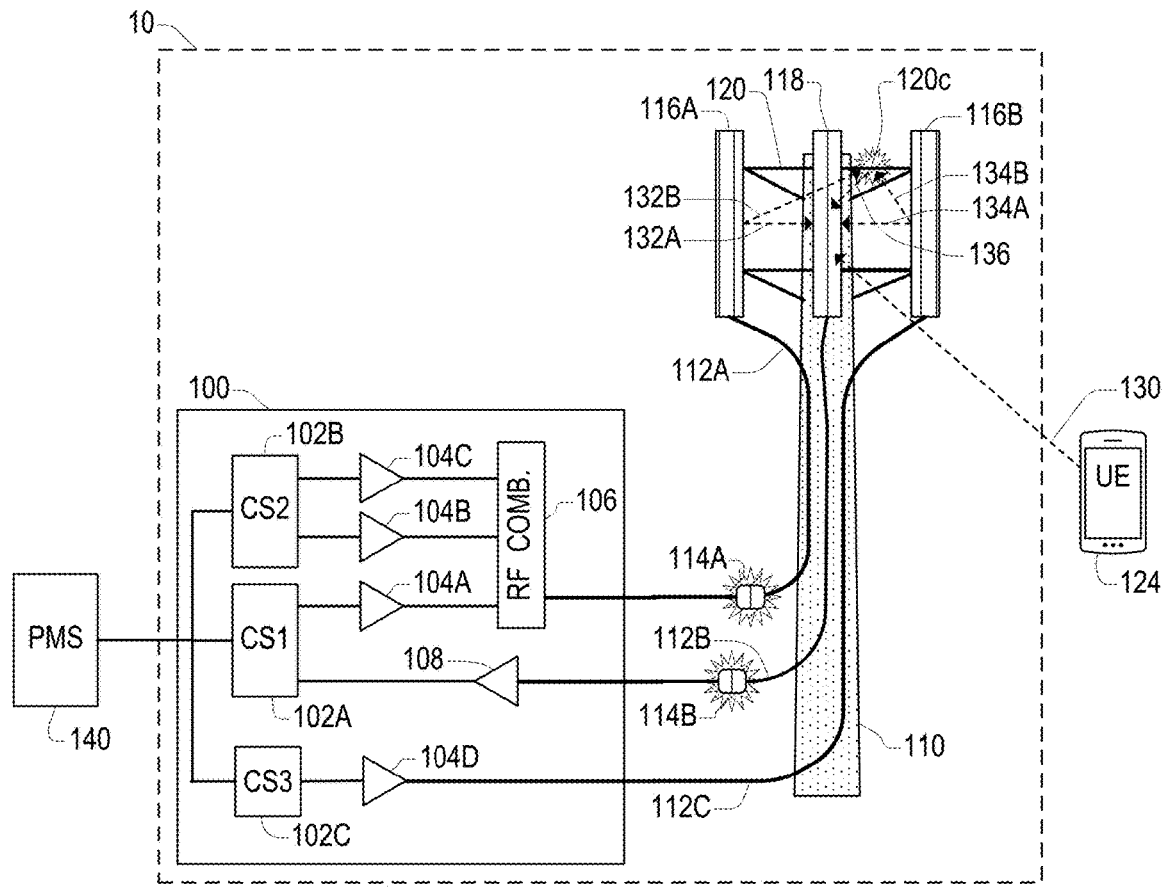
FIG. 1 illustrates an installation of a wireless communication system according to an embodiment.

FIG. 1 illustrates a wireless network installation (hereinafter installation) 10 according to an embodiment. The installation 10 includes an equipment locker 100 and a tower 110. The installation may comprise a Base Transceiver Station (BTS), Evolved Node B (eNodeB), or the like.

The equipment locker 100 includes first, second, and third control systems (CSs) 102A, 102B, and 102C. The first CS 102A transmits signals using a first power amplifier (PA) 104A and receives signals using a Low Noise Amplifier (LNA) 108. The second CS 102B transmits signals using second and third PAs 104B and 104C, and may also receive signals using one or more LNAs (not shown). The third CS 102C transmits signals using a fourth PA 104D, and may also receive signals using one or more LNAs (not shown). Frequencies transmitted using each of the first through fourth PAs may differ from each other, and may also differ from the frequencies received using the LNA 108.

The tower 110 includes first and second transmit antennas (TXANTs) 116A and 116B and a receive antenna (RXANT) 118. The antennas may be fixed to the tower 110 using struts 120 or similar structural elements. In the installation 10 illustrated in FIG. 1, a corroded area 120c is present on one of the structural elements of the tower 110.

Outputs of the first to third PAs 104A to 104C are combined by an RF Combiner 106 and delivered to the first TXANT 116A using a first coaxial cable 112A that includes a first connector 114A. The output of the fourth PA 104D is delivered to the second TXANT 116B using a third coaxial cable 112C. Signals received from user equipment (UE) 124 through the RXANT 118 are delivered to the LNA 108 through a second coaxial cable 112B that includes a second connector 114B.

The corroded area 120c, the first connector 114A, and the second connector 114B are each potential sources of PIM. For example, if corrosion or contact between metals with different galvanic potentials are present in the first connector 114A, PIM signals may be created by signals transmitted using each of the first to third PAs 104A to 104C and by combinations thereof.

If corrosion or contact between metals with different galvanic potentials are present in the second connector 114B, PIM signals may be created by first signal 132A transmitted by the first TXANT 116A and second signal 134A transmitted by the second TXANT 116B after each signal is received by the RXANT 118. If corroded area 120c is present, PIM signals 136 may be created by third signal 132B transmitted by the first TXANT 116A and fourth signal 134B transmitted by the second TXANT 116B, and the PIM signals 136 may be received by the RXANT 118.

One or more of the second through fourth PAs 104B to 104D may be transmitting at the same time as signals 130 are being received by the first CS 102A from the UE 124 through the LNA 108. The signals transmitted by the one or more of the second through fourth PAs 104B to 104D may have different frequencies than the frequencies of the signals 130 being received from the UE 124. Accordingly, in the absence of intermodulation, the simultaneously-transmitted signals of the second through fourth PAs 104B to 104D would not interfere with the signals 130. However, the PIM signals described above may interfere with reception of the signals 130.

The equipment configurations shown as being included in the equipment locker 100 and on the tower 110 may correspond to one sector of multi-sector wireless cell, and the equipment locker 100 and tower 110 may each include additional equipment configurations, similar to the configuration shown in FIG. 1, that respectively correspond to one or more other sectors of the wireless cell. Transmissions from each sector may generate PIM-caused interference in each of the other sectors of the wireless cell.

FIG. 1 also shows a performance monitoring (PM) system 140 in communication with the CSs 102A, 102B, and 102C. The PM system 140 may be located remotely from the installation 10, and may communicated with components of the installation 10 over a Wide-Area Network (WAN), a backhaul network, the Internet, or the like.

Each of the PM system 140 and the CSs 102A, 102B, and 102C may include respective processors, respective memories, and respective input and output devices. Embodiments of the present disclosure may be incorporated in whole or in part into the PM system 140, or one or more of the CSs 102A, 102B, and 102C, or both.

Figure 2:
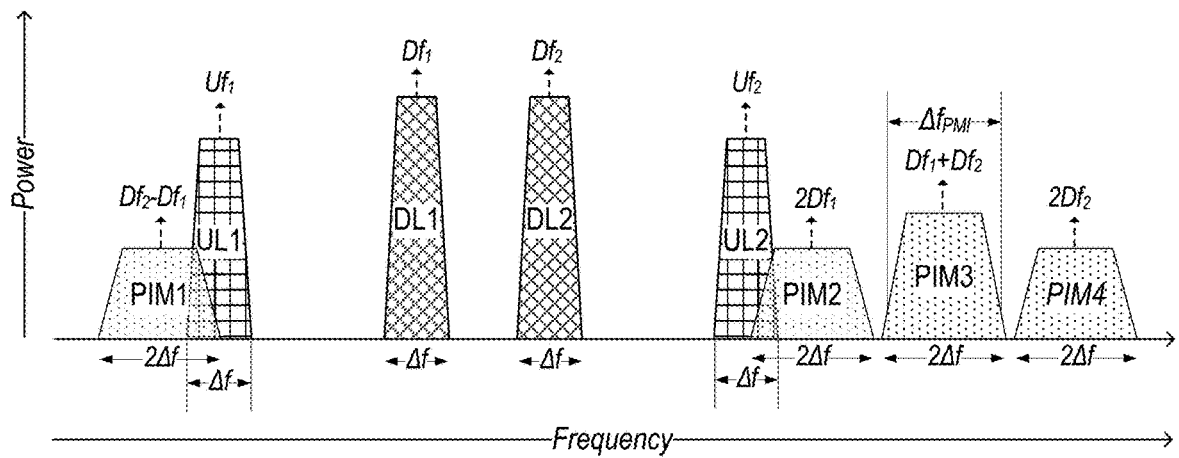
FIG. 2 illustrates the generation of interference by Passive Inter-Modulation (PIM).

FIG. 2 illustrates the generation of interference by Passive Inter-Modulation (PIM). FIG. 2 shows bandwidths of a first downlink (DL) signal DL1 having a first DL center frequency $Df_1$ and a bandwidth of $\Delta f$, a second DL signal DL2 having a second DL center frequency $Df_2$ and a bandwidth of $\Delta f$, a first uplink (UL) channel UL1 having a first UL center frequency $Uf_1$ and a bandwidth of $\Delta f$, and second UL channel UL2 having a second UL center frequency $Uf_2$ and a bandwidth of $\Delta f$. Although FIG. 2 shows an example where all of the UL channels and DL signals have a same bandwidth of $\Delta f$, embodiments are not limited thereto.

The first DL signal DL1, second DL signal DL2, first UL channel UL1, and second UL channel UL2 may each be signals or channels of respective cells of one or more wireless communication networks. The cells may operate independently, and may use different or shared antennas on a same tower or on towers that are near each other (e.g., the cells may be co-sited).

FIG. 2 also illustrates some of the PIM signals that may be generated from the interactions of one or more of the first and second DL signals DL1 and DL2 with a non-linear medium. A first PIM signal PIM1 is generated at a center frequency $DF_2-DF_1$ equal to the difference between the center frequency $DF_2$ of the second DL signal DL2 and the center frequency $DF_1$ of the first DL signal DL1. A second PIM signal PIM2 is generated at a center frequency $2 \cdot DF_1$ equal to twice the center frequency $DF_1$ of the first DL signal DL1. A third PIM signal is generated at a center frequency $DF_2+DF_1$ equal to the sum of the center frequency $DF_2$ of the second DL signal DL2 and the center frequency $DF_1$ of the first DL signal DL1. A fourth PIM signal PIM2 is generated at a center frequency $2 \cdot DF_2$ equal to twice the center frequency $DF_2$ of the second DL signal DL2.

The bandwidth of each PIM signal is equal to a sum of the bandwidths of the signals that caused the PIM signal to be generated. For example, because the first PIM signal PIM1 is generated from the mixing of the first and second DL signals DL1 and DL2 in the non-linear medium, the bandwidth of the first PIM signal PIM1 is equal to $2 \cdot \Delta f$. Similarly, because the second PIM signal PIM2 is generated from the mixing of the first DL signals DL1 with itself, the bandwidth of the second PIM signal PIM2 is also equal to $2 \cdot \Delta f$.

Not shown in FIG. 2 are PIM signals generated at center frequencies of $DF_1-DF_1$ and $DF_2-DF_2$, which would each have a bandwidth of $\Delta f$ starting at 0 Hz (DC). Such PIM signals are unlikely to interfere with uplink transmissions.

As shown in FIG. 2, the frequencies occupied by the first and second PIM signals PIM1 and PIM2 overlap with the frequencies occupied by the first and second UL channels UL1 and UL2, respectively. As a result, the first and second PIM signals PIM1 and PIM2 may interfere with the first and second UL channels UL1 and UL2, respectively.

FIG. 2 illustrates PIM signals generated by a quadratic mixing process, that is, a nonlinearity of order 2. For two signals $S_1(t)=A_1 \cdot \cos(2\pi f_1 \cdot t)$ and $S_2(t)=A_2 \cdot \cos(2\pi f_2 \cdot t)$, a mixing with nonlinearity of order 2 transfers energy to frequencies of the form $f=a_1f_1+a_2f_2$ for positive and negative integer values of $a_1$ and $a_2$ satisfying $|a_1|+|a_2|=2$.

FIG. 3 includes a Table 1 showing mixing products for order 2 and 3 non-linearities for two single-toned signals. As shown by Table 1, non-linearities of higher order produce a larger number of spurious signals.

Two properties of PIM signals can be seen in Table 1: First, it is possible to list all intermodulation combinations of a given nonlinearity order using simple combinatorial analysis. Second, given a nonlinearity of order n, the amplitude $A_{IM}$ of a particular intermodulation product of the form $a_1f_1+a_2f_2$, where $|a_1|+|a_2|=n$, satisfies:

$$A_{IM} \propto A_1^{|a_1|} A_2^{|a_2|} \quad \text{Equation 1}$$

where $\propto$ indicates "proportional to." For example, the amplitude of the mixing product corresponding to the combination $f_1-f_2$ produced by a nonlinearity of order 2 is proportional to $A_1 A_2$ (see the corresponding entry in Table 1), reflecting the dependence of the intermodulation energy on the combinatorial weights $a_1=1$ and $a_2=-1$.

For real-valued, band-limited signals such as signals that are used in wireless communication cellular networks, e.g., signals $S_1$ and $S_2$ centered at frequencies $f_1$ and $f_2$ and having finite bandwidths $\Delta f_1$ and $\Delta f_2$, respectively, the spectral representation is given by:

$$\hat{S}_1(f) = A_1(f-f_1)e^{i2\pi(f-f_1)t} + \overline{A_1}(f-f_1)e^{-i2\pi(f-f_1)t}, \quad \text{Equation 2}$$
$$-\frac{\Delta f_1}{2} \le f \le +\frac{\Delta f_1}{2}$$

$$\hat{S}_2(f) = A_2(f-f_2)e^{i2\pi(f-f_2)t} + \overline{A_2}(f-f_2)e^{-i2\pi(f-f_2)t},$$
$$-\frac{\Delta f_2}{2} \le f \le +\frac{\Delta f_2}{2}$$

where $A_1(f)$ and $A_2(f)$ are complex-valued functions with compact support, i.e., $A_i(f) \equiv 0$ for $|f| > \Delta f_i/2$, and $\overline{A}_i$ denotes the complex conjugate of $A_i$. When band-limited signals $S_1$ and $S_2$ are mixed through a quadratic process, i.e. a nonlinearity of order 2, PIM-caused band-limited signals centered at frequencies corresponding to intermodulation products (also known as intermodulation mixing products) are generated, as illustrated in FIG. 2, wherein the case $\Delta f1 = \Delta f2 = \Delta f$ is considered. The effective PIM bandwidth $\Delta f_{PIM}$ of these PIM-caused signals is:

$$\Delta f_{PIM} = \delta_n(\Delta f_1 + \Delta f_2) \quad \text{Equation 3}$$

where the effective bandwidth pre-factor $\delta_n$ is chosen so that 99% of the energy of the PIM-caused signal is contained within the effective PIM bandwidth. Illustrative values of the effective bandwidth pre-factor $\delta_n$ for orders 2 through 7 are shown in Table 2 in FIG. 4.

PIM-caused interference may occur when the spectral density of a PIM-caused signal overlaps with an uplink channel operating in the vicinity of the area where the PIM-caused signal was generated. For example, as shown in FIG. 2, communications being performed using the first UL channel UL1 is being affected by the PIM signal PIM1 corresponding to DL2-DL1, and communications being performed using the second UL channel UL2 is being affected by the PIM signal PIM2 corresponding to 2·DL1. From the relation between the intermodulation amplitudes and the mixing coefficients $a_1$ and $a_2$, the power of the intermodulation product and thus the interference power $P_{interf}$ generated by a PIM signal will satisfy:

$$P_{interf} \propto P_1^{|a_1|} P_2^{|a_2|} \quad \text{Equation 4}$$

where $P_1$ and $P_2$ are the respective transmission powers of the first and second DL signals DL1 and DL2. In the simple scenario shown in FIG. 2, the amount of interference power affecting first UL channel UL1 will be proportional to $P_1 \cdot P_2$, while the amount of interference affecting the second UL channel UL2 will be proportional to $P_1^2$.

Embodiments of the PIM interference detection processes disclosed herein rely on this fundamental relation between the uplink interference caused by PIM and the transmission power of cells contributing to the formation of the PIM-caused signals to assess the likelihood of uplink interference measurements at a cell being caused by PIM processes. Since wireless communications equipment typically reports values associated with uplink interference power in logarithmic units, e.g., dBm, the relationship of Equation 4, above, may be rewritten as:

$$\log_{10}(P_{interf}) = C|a_1|\log_{10}(P_1) + |a_2|\log_{10}(P_2) \quad \text{Equation 5}$$

where the offset C expresses the proportionality of the relation. Knowledge of the actual value of C is not relevant for the analysis or for the operation of the PIM interference detection process. Based on Equation 5, a Weighted Downlink Power (WDP) signal may be constructed as:

$$WDP = |a_1|\log_{10}(P_1) + |a_2|\log_{10}(P_2) \quad \text{Equation 6}$$

which may be considered an "expected signature of PIM-caused interference." When PIM is the only source of interference detected by a cell for an UL signal, any Uplink Interference Metric (UIM) signal for the cell defined over some finite time interval should display a behavior that mimics the relation UIM(t)=WDP(t) at least for some range of values of interference measurements. That is, if PIM-caused signals are the only source of interference, the UIM will vary over time in the same manner as the WDP does. An example UIM signal is a weighted average of the pmRadioRecInterferencePwr counter (corresponding to a measured uplink noise and interference power on a Physical UL Shared Channel (PUSCH)) for Ericsson equipment over a 24-hour period.

In practice, interference measurements are lower-bounded by the dynamic range of the measurement equipment, effectively establishing an interference floor $UIM_0$. As a result, a more realistic relation between the PIM interference expressed in the UIM and the PIM interference expectation represented by the WDP is UIM(t)=max($UIM_0$, WDP(t)), as illustrated in FIG. 5. This relationship between expected PIM interference (WDP) and measured PIM interference (UIM) provides a condition for PIM detection: if the UIM of a given cell does not satisfy the fundamental relation with the WDP signal, then the interference should not be attributed to PIM. The methodology described in this document relies on the (WDP, UIM) relation to estimate the likelihood of the detected interference being caused by PIM.

FIG. 7 illustrates a process 700 for detecting PIM-caused interference (intermodulation products) at a focus cell $C_f$, according to an embodiment. The process 700 may be performed by, for example, a control system (CS) located at site of the focus cell $C_f$ such as the first CS 102A of FIG. 1, or by a PM system remote from the site of the focus cell $C_f$ such as the PM system 140 of FIG. 1, but embodiments are not limited thereto. In an embodiment, the focus cell $C_f$ may be one sector of a multi-sector cell.

The process 700 includes an initialization phase and an operational phase. The initialization phase may be performed at installation or startup of the focus cell $C_f$, or whenever a change in local radio environment (such as an installation of a new co-sited transmitter, a removal of an existing co-sited transmitter, a change in the operation of a co-sited transmitter, or the like) occurs. The operational phase may be performed periodically (for example, once a day) to detect interference caused by PIM.

At S702 of the initialization phase, the process 700 performs an initial inventory of transmitters that are near a focus cell $C_f$. Transmitters near the cell may include transmitters co-sited with (e.g., transmitting from the same tower or physical support as) the focus cell $C_f$. The inventory includes the transmission frequencies used by the nearby transmitters and the power levels used to transmit in each frequency. The transmitters may include transmitters operated by the same entity as the focus cell $C_f$ (such as 3G transmitters operated by the operator of a 4G focus cell or transmitters in a different sector of the base station) and transmitters operated by different entities than the operator of the focus cell $C_f$.

At S704 of the initialization phase, the process 700 determines potential intermodulation products that can be generated by PIM of signals from the nearby (that is, inventoried) transmitters. In particular, the intermodulation products that may interfere with uplink transmission to the focus cell $C_f$ are determined and the degree to which those intermodulation products might impact the uplink transmission is assessed.

Consider a communication system consisting of M co-sited cells $C^{(i)}$ having uplink and downlink channels centered at frequencies $f_{UL}^{(i)}$ and $f_{DL}^{(i)}$, respectively, and having bandwidths $\Delta f^{(i)}$ for all $1=1$ M (it is common industry practice to operate both the uplink and downlink channels with the same bandwidth). For the sake of generality it is assumed that $f_{UL}^{(i)} \neq f_{DL}^{(i)}$, i.e. all cells operate in the Frequency-Division Duplex (FDD) mode. The case for cells operating in the Time-Division Duplex (TDD) mode will be treated as a special case, and its discussion is deferred until later in this document. The process for generation of intermodulation products assumes that $f_{UL}^{(i)} \neq f_{DL}^{(j)}$ for $i \neq j$, i.e., only one cell is transmitting on each downlink channel. The case for multiple cells using the same downlink channel may be handled by maintaining a list of cells per downlink channel.

For the simplified communication system described above, an intermodulation product of order n is defined as the pair $I_n = (f_1, \Delta f_1)$, where:

$$f_l = \sum_{k=1}^{M} \alpha_k f_{DL}^{(k)},$$ Equation 7

$$\Delta f_l = \delta_n \sum_{k=1}^{M} |\alpha_k| \Delta f^{(k)}$$

$$\alpha_k \in \mathbb{Z} \forall k \text{ and } \sum_{k=1}^{M} |\alpha_k| = n$$

where $f_1$ is the center frequency of the interference signal, $\Delta f_1$ is the bandwidth of the interference signal, and $\delta_n$ is the effective bandwidth pre-factor from Table 2. Given a focus cell $C_f$ with uplink channel $UL_f$ the set $IM_n(C_f)$ of intermodulation products of order n which potentially contribute to uplink interference at $C_f$ is defined as:

$$IM_n(C_f) = \{I_n = (f_1, \Delta f_1) : I_n \cap UL_f \neq \emptyset\}$$ Equation 8 that is, $IM_n(C_f)$ is the set of intermodulation products whose frequencies have a non-null intersection with the uplink channel. In addition to the center frequency and bandwidth associated with each $I_n$ in $IM_n(C_f)$, the parameter $\kappa_{UL}$ corresponding to the percentage of the uplink channel $UL_f$ that intersects the intermodulation product $I_n$ is computed, e.g.: $\kappa_{UL} = \Delta(I_n \cap UL_f)/\Delta UL_f$, where $\Delta(I_n \cap UL_f)$ is the bandwidth of the intersection of $I_n$ and $UL_f$ and $\Delta UL_f$ is the bandwidth of the uplink channel $UL_f$.

The sets $IM_n(C_f)$ are generated for each applicable order n of nonlinear interference and all of the inventoried transmitters, and are then stored in a long-term retention database for later use, as they depend on network configuration parameters which change only rarely over long periods of time. For example, in an embodiment, sets $IM_2(C_f)$, $IM_3(C_f)$, $IM_4(C_f)$, and $IM_5(C_f)$ may be generated for nonlinear interference of orders 2, 3, 4, and 5, respectively. The information stored for each intermodulation product $I_n$ is summarized in Table 3 of FIG. 6.

Sets $IM_n(C_x)$ may be generated for one or more other cells as described for the focus sell $C_f$, and these sets may also be stored in the long-term retention database.

Cells operating in the Time Division Duplexing (TDD) mode are considered as special cases at the intermodulation products generation stage of S704. Given that at any particular time a TDD cell can be in either transmission or reception mode, but not both, and that it is standard industry practice to synchronize all TDD cells sharing a frequency band in a region, i.e. all co-sited TDD cells operating on the same frequency band switch between transmission and reception modes in synchrony, the following principle is applied during the computation of intermodulation products:

A TDD cell cannot contribute to PIM for any co-sited TDD cell in the same frequency band.

According to this principle, the set of overlapping intermodulation products $IM_n(C_f)$ of a focus cell $C_f$ using TDD does not includes mixing products IM which have contributions from TDD cells operating on the same frequency band as the focus cell $C_f$.

Turning to the operational phase, at S706 the process 700 performs a data acquisition stage. Given the focus cell $C_f$ the data acquisition stage retrieves the following information from the corresponding data source(s):

1. An Uplink Interference Metric (UIM) signal for the focus cell $C_f$ (e.g., the weighted average of the pmRadioRecInterferencePwr counter for LTE cells using Ericsson equipment). Potential data sources for UIM signals may include one or more short-term retention databases, an Operations Support System (OSS) directly, or both.
2. A Downlink Power Metric (DLPwr(i)) signal for each cell $C_i$ co-sited with $C_f$. For example, for cells using Ericsson equipment, the DLPwr(i) may be the weighted average of the pmTransmittedCarrierPower counter. Potential data sources for DLPwr(i) signals are the same as for the UIM signals.
3. The sets of intermodulation products $IM_n(C_f)$ for all nonlinearity orders of interest (in most cases, nonlinearities of order up to 5 are sufficient for PIM analysis). For each nonlinearity order n, the set $IM_n(C_f)$ consists of all the mixing products $I_n$ which have a non-zero overlap with the uplink channel of the focus cell $C_f$. The data source for $IM_n(C_f)$ is the long-term retention database described above with reference to Table 3 of FIG. 6.

The information described above is determined using samples collected on a periodic basis. For example, the system may collect the UIM signal for the focus cell $C_f$ and the DLPwr(i) of the co-sited cells $C_i$ every 15 minutes (i.e., 96 times a day). Each of the UIM signal and the DLPwr(i) signals may include a respective plurality of values corresponding to a period of time. The period of time may include a plurality of timestamps, and each value of the UIM signal and each value of the DLPwr(i) signals may correspond to one of the plurality of timestamps.

At S708, the process 700 determines a set of Weighted DL Power (WDP$_I$) signals from the individual downlink power signals of the inventoried nearby (e.g., co-sited) cells.

For each nonlinearity order n being considered (e.g., for each of n=2, 3, 4, and 5) for the focus cell $C_f$ and the data sets $\{IM_n(C_f), DLPwr(1), \ldots, DLPwr(M)\}$ described above, an intermediate set of signals associated with the downlink power of the co-sited cells of $C_f$ is generated as follows:

Sub-step 1a: For each intermodulation product I in $IM_n$ ($C_f$), compute the Aggregated Downlink Power AggDP signals (one for each contributing downlink frequency):

Identify all different downlink frequencies available in the site, and the corresponding cells associated with each frequency.

For each downlink frequency, add the DLPwr(k) signals of all cells associated with the downlink frequency to determine a $k^{th}$ Aggregated Downlink Power AggDPk signal. In an embodiment, the DLPwr(k) for k=1, . . . , M are in linear scales and normalized to be in the interval [0,1], in order to avoid signals with large dynamic ranges overpowering other signals.

In an embodiment, if DLPwr(k) is unavailable from the data repository for some k, assume a value of 1.0 for all time stamps under consideration (Full Transmission Power Assumption). In other embodiments, historical averages/trends of DLPwr for a source cell or the site average of available downlink power signals may be substituted for missing DLPwr of the source cell.

Sub-step 1b: For each intermodulation product I in $IM_n$ ($C_f$), compute the Weighted Downlink Power signal WDP$_I$ associated to the given intermodulation product I:

$$WDP_I = \frac{1}{I \cdot \text{order}} \sum_{k \in \text{source freq.}} |\alpha_k| \log_{10}(AggDP_k) \qquad \text{Equation 9}$$

where $\alpha_k$ is the multiplier corresponding to each harmonic involved in the definition of the intermodulation product I. The pre-factor 1/I.order is included in the computation of WDP$_I$ to reflect the dependence of a power level of PIM interference on the order of the nonlinearity causing it, which effect is to change the slope of the fundamental relation (WDP, UIM) from m=1 (as shown in FIG. 5) to m=I.order.

Sub-step 2. Using the set $\{WDP_I\}$ of weighted downlink power signals, compute the Averaged Weighted Downlink Power signal AvgWDP as:

$$AvgWDP = \sum_{I \in IM_n(C_f)} \beta_I WDP_I \qquad \text{Equation 10}$$

$$\beta_I = I \cdot \text{overlap} \Big/ \sum_{I_j \in IM_n(C_f)} I_j \cdot \text{overlap} \qquad \text{Equation 11}$$

Wherein I.overlap indicates a percentage of the uplink bandwidth overlapped by the intermodulation product I, and $\beta_I$ corresponds to I.overlap divided by a sum of all the overlap $I_j$.overlap of all the intermodulation products that interfere with the focus cell $C_f$. After sub-steps 1 and 2, the total number of WDP signals should be length($IM_n(C_f)$)+1: one for each intermodulation product I plus the averaged WDP from sub-step 2. In addition to the UIM signal, the set of WDP signals will be used to generate the set of linear models used by the process 700 to detect PIM-caused interference.

At S710, the process 700 constructs a set of piece-wise linear models (one linear model for each WDP$_I$ signal) for each of the data sets $\{WDP_I, UIM\}$. The piece-wise linear models may be constructed using regression analysis.

A configuration parameter, ConfigParam.NumOfSegments, is required for the linear model analysis stage. The parameter specifies the number of partitions for each of the intervals [min(WDP$_k$), max(WDP$_k$)] associated to each weighted downlink power functions WDP$_k$ described above. These partitions are used in the computation of local linear models as described below.

For each available WDP$_k$ signal (one for each I plus one for AvgWDP as described above), the process 700 produces one global linear model and several local linear models.

The process 700 produces the global linear model by finding the parameters ($m_G$, $b_G$) of the linear model $\hat{y} = m_G \hat{x} + b_G$ that fits the data set (WDP$_k$, UIM) in the least-squares sense, and compute the average global dispersion/spread $\sigma_G$ of the data points from the model. The process 700 then computes the global correlation $\rho_G$ between the WDP$_k$ and UIM signals and computes the minimum and maximum values of the UIM signal.

The process 700 produces the local models by segmenting the data set (WDP$_k$, UIM) into data subsets (WDP$_k$(j), UIM(j)), j=1 . . . ConfigParam.NumOfSegments, by splitting the range of values of WDP$_k$ into ConfigParam.NumOfSegments segments. Thus, in an illustrative example having N segments wherein each segment corresponds to a respective portion of the distribution of the expected power values, WDP values in a first Nth percentile (0 to 1/N) (i.e., the lowest WDP values) and their respective UIM values are placed in a first segment, WDP values in a second Nth percentile (1/N to 2/N) and their respective UIM values are placed in a second segment, and so on, with the highest WDP values and their respective UIM values being placed in the Nth segment.

For each segment, the process 700 computes the parameters (m(j), b(j)) of the linear model $\hat{y} = m_j \hat{x} + b_j$ that fits the data subset (WDP$_k$(j), UIM(j)) in the least-squares sense, computes the average local dispersion/spread $\sigma$(j) of the data points from the local model, computes the local correlation $\rho$(j) between the WDP$_k$(j) and UIM(j) signals, and computes the minimum and maximum values of the UIM(j) signal over the (j)-th segment.

Accordingly, at S710 the process 700 produces length ($IM_n(C_f)$)+1 global linear models and ConfigParam.NumOfSegments×length($IM_n(C_f)$)+1 local linear models. For example, if there are 6 intermodulation products that may interfere with uplink transmissions of the focus cell $C_f$, and 8 segments are used, then 7 global linear models and 56 local linear models are produced: a global linear model for each WDP$_I$ (where I corresponds to an intermodulation product), a global linear model for the AvgWDP, a local linear model for each segment for each WDP$_I$, and a local linear model for each segment for the AvgWDP.

At S712, the process 700 performs PIM Detection Assessment (PIMDA) to detect the presence of PIM-caused interference. The process determines a PIMDA score $\rho$ corresponding to a likelihood that the observed uplink interference is attributable to PIM. The process 700 may report the PIMDA score ρ to an operator of the focus cell $C_f$, who may then decide whether remedial action is appropriate to address the PIN-generated interference.

In an embodiment, the process 700 reports the PIMDA score ρ to the operator when the PIMDA score ρ is higher than a predetermined threshold. In an embodiment, the process 700 reports the PIMDA score ρ when it is substantially higher (e.g., increases by more than a predetermined percentage, such as 50%) than a previous PIMDA score of the focus cell $C_f$.

In an embodiment, the process 700 reports the PIMDA score ρ to the operator according to a comparison of the PIMDA score ρ to one or more respective PIMDA scores of one or more co-sited cells of the focus cell.

Figure 8:
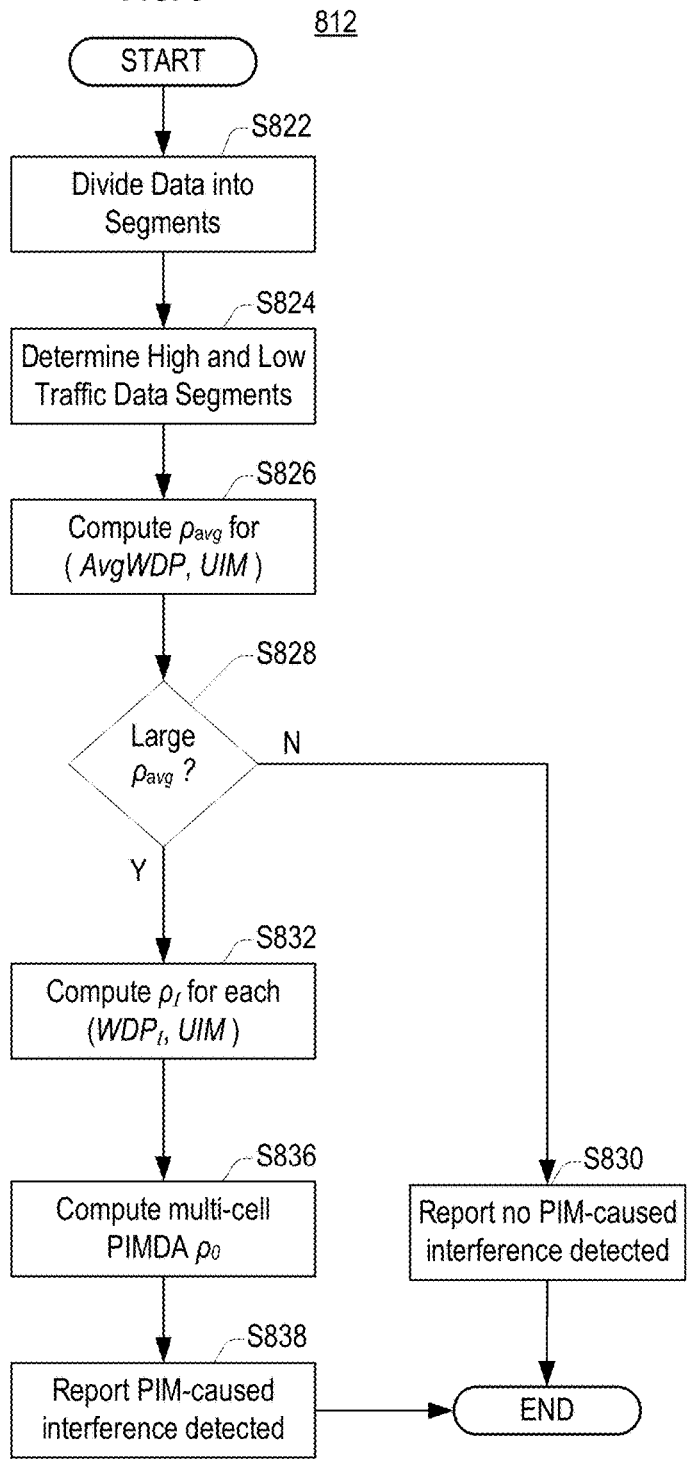
FIG. 8 illustrates a process for performing a PIM assessment, according to an embodiment.

FIG. 8 illustrates a process 812 for performing a PIM Detection Assessment (PIMDA) according to an embodiment. The process 812 may be performed as part of S712 of process 700 of FIG. 7.

At S822, the process 812 divides the data into data segments, each data segment corresponding to one of the local linear models determined in S710 of process 700.

At S824, the process 812 determines for each of the data segments whether the data segment is a high traffic segment or a low traffic segment. The identification of traffic levels in each segment may be made using, for example, downlink power DLPwr data for each segment. In an illustrative embodiment, ⅔rds of the segments are determined to be low traffic segments, and ⅓rd of the data segments are determined to be high traffic segments, according to the percentile-based ordering described above with respect to process 700.

At S826, the process 812 determines an Average PIMDA score $\rho_{avg}$ using all the linear models (local and global) corresponding to the data set comprising the Averaged Weighted Downlink Power signal AvgWDP signal and the UIM signal (AvgWDP, UIM). The Average PIMDA score $\rho_{avg}$ may be determined as described with respect to FIG. 9, below.

At S828, the process 812 determines whether the Average PIMDA score $\rho_{avg}$ is large. In an embodiment, the Average PIMDA score $\rho_{avg}$ is determined to be large if it is larger than a predetermined threshold. In another embodiment, the Average PIMDA score $\rho_{avg}$ is determined to be large if it is substantially larger than a previously determined Average PIMDA score.

In response to the process 812 determining that the Average PIMDA score $\rho_{avg}$ is large, at S828 the process 812 proceeds to S832; otherwise the process 812 proceeds to S830.

At S830, in response to the process 812 determining that Average PIMDA score $\rho_{avg}$ is not large, the process 812 reports that PIM-caused interference was not detected. In an embodiment, at S830 the process 812 returns a FALSE result and an empty PIMDA score list.

At S832, the process 812 determines, using all the linear models (local and global), a per-intermodulation-product PIMDA score set $\{\rho_I\}$ respectively corresponding to the data set comprising the per-intermodulation-product Weighted Downlink Power signals WDP$_I$ and the UIM signal (WDP$_I$, UIM). Each per-intermodulation-product PIMDA score $\rho_I$ may be determined by the process described with respect to FIG. 9, below. The process 812 then creates a list $\{I_{High}\}$ of the intermodulation products I having high respective PIMDA scores $\rho_I$. The process 812 may determine whether an intermodulation-product PIMDA score $\rho_I$ is high in a similar manner to that described for the Average PIMDA score $\rho_{avg}$ with respect to S828.

At S836, given a set of PIMDA scores $\{\rho_C\}$ respectively corresponding to different cells, the process 812 may compute a score threshold $\rho_0 = \mu_\rho + \sigma_\rho$, wherein $\mu_\rho$ is the statistical mean and $\sigma_\rho$ is the standard deviation of the set of PIMDA scores $\{\rho_C\}$, to determine whether the interference detected at a cell $C_f$ can be attributed to PIM. In an embodiment, the process 812 determines that interference detected at a cell $C_f$ is caused by PIM when $\rho_{C_f} > \rho_0$. A PIMDA score ρ corresponds to the likelihood of PIM being the cause of the detected interference, with values of ρ closer to 1 indicating a higher likelihood.

Figure 9:
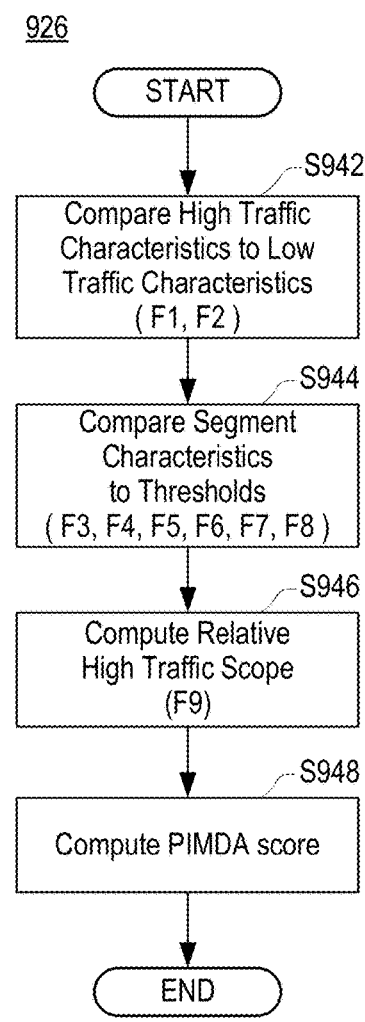
FIG. 9 illustrates process for calculating a PIM Detection Assessment (PIMDA) score according to an embodiment.

FIG. 9 illustrates process 926 for calculating a PIMDA score according to an embodiment. The process 926 may be used in S826 of the process 812 of FIG. 8 to produce an Average PIMDA score, or may be used in S832 of the process 812 to produce each of the per-intermodulation-product PIMDA scores. The process 926 uses the parameters of a linear models determined in S710 of process 700 of FIG. 10, such as the slope m of each linear model, as well as other parameters (such as the spread σ) of the data used to determine the linear models. The linear models may include one global linear model corresponding to a plurality of data segments and a plurality of local linear models each corresponding to a respective data segment of the plurality of data segments.

To perform the PIM Detection Assessment on the linear model, a set of features $\{F_i\}$ characterizing the relation between the Weighted Downlink Power signal WDP and Uplink Interference Metric signal UIM is computed, as described below. In the embodiment illustrated, nine features (F1 through F9) are calculated by the process 926, but embodiments are not limited thereto.

At S942, the process 926 determines features related to differences between the local linear models of high-traffic data segments and the local linear models of low traffic data segments. The purpose of these features is to determine how similar is the measured UIM vs. WDP relation to the expected signature depicted in FIG. 5.

At S942, the process 926 may determine a first feature F1, a Boolean value that corresponds to an increase in the slope of the local linear models corresponding to high traffic data segments when compared to the local linear models for the low traffic segments. The process 926 determines an average of the slopes slope$_{HIGH}$ of the local linear models for the high traffic segments and an average of the slopes slope$_{LOW}$ of the local linear models for the low traffic segments, and computes the value of the first feature F1 as:

$$F1 = \text{average}(\text{slope}_{HIGH}) > \text{average}(\text{slope}_{LOW}) \qquad \text{Equation 10}$$

The first feature F1 being true indicates that measured interference was higher during times when the power of an intermodulation product associated with the linear models used to generate the first feature F1 would be expected to be higher if PIM was present. Accordingly, the first feature F1 being true tends to indicate the presence of PIM.

At S942, the process 926 may also determine a second feature F2, a Boolean value that corresponds to an increase in the spreads for the local linear models corresponding to high traffic data segments when compared to the local linear models for the low traffic segments. The process 926 determines an average of the spreads $\sigma_{HIGH}$ of the local linear models for the high traffic segments and an average of the spreads $\sigma_{LOW}$ of the local linear models for the low traffic segments, and computes the value of the second feature F2 as:

$$F2 = \text{average}(\sigma_{HIGH}) > \text{average}(\sigma_{LOW}) \qquad \text{Equation 10}$$

Feature F2 is included to accommodate scenarios where other sources of interference, in addition to PIM-based interference, are present. When this is the case, the spread a represents the deviation of interference from a linear model that is expected in the presence of PIM-based interference alone. In some circumstances, it was observed that an increase in the spread a was observed in moving from low-traffic conditions to high-traffic conditions, requiring the average over high-traffic segments to be greater than the average over low-traffic segments.

At S944, the process 926 determines features related to thresholds for the global and local linear models. Examples of the thresholds are shown in Table 4 of FIG. 10.

At S944, the process 926 may determine a third feature F3, a Boolean value corresponding to a slope of the global linear model. The third feature F3 is determined according to:

$$F3 = m_G > \text{ThreshSlope}_{glob}, \qquad \text{Equation 11}$$

where $m_G$ is the slope of the global linear model and $\text{ThreshSlope}_{glob}$ is determined as shown in Table 4: $\text{ThreshSlope}_{glob} = \mu_G + \sigma_G$, wherein $\mu_G$ is the mean and $\sigma_G$ is the standard deviation of the data used to construct the global linear model, and is computed dynamically from the set of analyzed cells. Feature F3 measures how large the slope of the global linear model associated with a focus cell is compared to the slope of the global linear model corresponding to other cells in the network, that is, it takes into account the rank of the focus cells, in terms of the slope of the global linear model, in the network. Hence the comparison with a threshold based on statistics (mean+standard deviation) for the global slopes.

At S944, the process 926 may also determine a fourth feature F4, a Boolean value corresponding to a slope of the local linear models for the high traffic data segments. The fourth feature F4 is determined according to $$F4 = \text{average}(\text{slope}_{HIGH}) > \text{ThreshSlope}_{high}, \qquad \text{Equation 12}$$

where $\text{ThreshSlope}_{high}$ is determined as shown in Table 4: $\text{ThreshSlope}_{high} = \mu_{hi} + \sigma_{hi}$, wherein $\mu_{hi}$ is the mean and $\sigma_{hi}$ is the standard deviation of the data used to construct the local linear models of the high traffic data segments, and is computed dynamically from the set of analyzed cells. Feature F4 captures the behavior of "expected PIM-caused interference", that is, the plot shown in FIG. 5. For this condition/behavior to be satisfied, the average of the slopes of linear models corresponding to high-traffic segments must be greater than a threshold computed from the average slopes during high-traffic conditions of other analyzed cells. Feature 4 differs from Feature 1 in that Feature 1 compares slopes between linear models of the same cell but different traffic conditions, while Feature 4 compares slopes for the same traffic conditions but different cells.

At S944, the process 926 may also determine a fifth feature F5, a Boolean value corresponding to whether a slope of a highest-traffic segment is greater than a threshold derived from the average slope of the high traffic segments:

$$F5 = \text{slope}[n\text{Segm}] > \text{ThreshSlope}_{nonDecr}, \qquad \text{Equation 13}$$

wherein nSegm indicates the data segment with the highest traffic, slope[nSegm] is the slope of the local linear model of the data segment having the highest traffic, and as shown in Table 4, $\text{ThreshSlopenonDecr} = 0.25 \cdot \text{average}(\text{slope}_{HIGH})$. Feature F5 takes into account situations where the interference profile "saturates" to a fixed value as conditions change from low-traffic conditions to high-traffic conditions. This feature prevents the labeling of interference measurements that show this "saturation" behavior as "PIM." During testing, saturation behavior was found to be more related to traffic-based interference (from neighboring cells) than to PIM-caused interference.

At S944, the process 926 may also determine a sixth feature F6, a Boolean value corresponding to a magnitude of a range of UIM signal values of a lowest-traffic segment:

$$F6 = \delta\text{UIM}[0] < \delta\text{UIMThresh}_{low}, \qquad \text{Equation 14}$$

wherein $\delta\text{UIM}[0]$ is the length of the range of the UIM signal values of the lowest-traffic data segment and $\delta\text{UIMThres}_{low}$ is a predetermined constant (e.g., 3 dB) as shown in Table 4. The measurements included in the UIM signal are already in dBm units, so it is compared with predetermined threshold expressed in dB. Feature F6 deals with cases when interference from other sources (i.e. not PIM) are present during low-traffic conditions. Since the aim is to determine how similar the interference signature is to the plot in FIG. 5, the interference must be "flat" (small $\delta\text{UIM}$) during low-traffic conditions. $\delta\text{UIM}[0]$ is the $\delta\text{UIM}$ of the first (lowest traffic) segment in the data partition.

At S944, the process 926 may also determine a seventh feature F7, a Boolean value corresponding to a magnitude of a range of UIM signal values of a highest-traffic segment:

$$F7 = \sigma\text{UIM}[n\text{Segm}] > \sigma\text{UIMThresh}_{high}, \qquad \text{Equation 15}$$

wherein $\delta\text{UIM}[n\text{Segm}]$ is the length of the range of the UIM signal values of the highest-traffic data segment and $\delta\text{UIMThresh}_{high}$ is a predetermined constant (e.g., 3 dB) as shown in Table 4. Feature F7 is the flip side of feature F6: a large $\delta\text{UIM}$ must occur during high-traffic conditions for the interference signature to resemble the plot in FIG. 5. $\delta\text{UIM}[n\text{Segm}]$ is the $\delta\text{UIM}$ of the last (highest traffic) segment in the data partition.

At S944, the process 926 may also determine an eighth feature F8, a Boolean value corresponding to a magnitude of a floor of UIM signal values of a highest-traffic segment:

$$F8 = \min(\text{UIM}[n\text{Segm}]) > \text{floorUIMThresh}_{high}, \qquad \text{Equation 16}$$

wherein UIM[nSegm] is the set of UIM signal values of the highest-traffic data segment and $\text{floorUIMThresh}_{high} = \mu_{floor} + 1.5$ dB as shown in Table 4, where $\mu_{floor}$ is the mean, taken over the whole set of analyzed cells, of the minimum value of the UIM signal restricted to the last data segment (see the next paragraph). Feature F8 captures the requirement for the interference signature to have elevated values during high-traffic conditions.

At S944, the process 926, in determining the threshold values of Table 4, computes statistical parameters $\mu$ and $\sigma$ corresponding to the mean and the standard deviation, respectively, using the full set of cells $C_f$ for which, given the intermodulation order n, the set $\text{IM}_n(C_f)$ is non-empty.

At S946, the process 926 determines a ninth feature F9, a real value corresponding to a slope of the highest traffic data segment relative to an expected slope for PIM generated by the given intermodulation order of the intermodulation product $I_n$:

$$F9 = \text{slope}[n\text{Segm}]/I_n.\text{order}, \qquad \text{Equation 17}$$

At S948, the process 926 computes the PIMDA score $\rho$ corresponding to the likelihood that the measured uplink interference is caused by PIM according to:

$$\rho = \sum_{F_i \in Features} \gamma_i F_i \text{ subject to } \sum \gamma_i = 1 \quad \text{Equation 18}$$

where each of F1 through F8 is either 0 or 1, F9 is a real number, and $\{\gamma_i\}$ is set of weights having values chosen to emphasize the features associated with the slope of the linear models for high-traffic segments, and de-emphasizes the spread of the linear models. Example values for $\{\gamma\}$ according to an embodiment are shown in Table 5 of FIG. 11.

FIG. 12 illustrates a system 1200 for remote detection of PIM-caused interference according to an embodiment. The elements of the system 1200 may be implemented in, for example, a control system located at the site of a base station, a performance monitoring system remote from the site of the base station and communicating with one or more base stations, or a combination thereof.

The system 1200 may store and retrieve data from a Short-Term Retention Database (Short Term DB) 1202 and a Long Term Retention Database (Long Term DB) 1204. The system 1200 may also obtain data from an Operations Support System (OSS) 1206 of a wireless communication network.

The system 1200 operates using an IM Product Generation stage 1208, a Data Acquisition stage 1210, a Signal Generation stage 1212, a Linear Model Analysis stage 1214, a PIM Detection Assessment (PIMDA) stage, and a Decision Stage 1218. Each stage of the system 1200 may comprise hardware, software, or combinations thereof, wherein the hardware may include a processor, a memory, an input/output device, or combinations thereof. In an embodiment, two or more of the stages share hardware, software, or both.

The IM Product Generation stage 1208 may be performed infrequently, such as when a base station is first activated or a configuration of nearby transmitters is altered. The IM Product Generation stage 1208 generates, for each cell C in the network and for each nonlinearity order n, the set $\{IM_n(C)\}$ consisting of all intermodulation products of order n which overlap with the cell C's uplink channel. Each set $\{IM_n(C)\}$ stored in the Long Term DB 1204.

In an embodiment, the information stored in the Long Term DB 1204 is updated by performing the IM Product Generation stage 1208 whenever there are changes in the configuration (cell plan) of the wireless network. In an embodiment, the information stored in the Long Term DB 1204 includes the information shown in Table 3 of FIG. 6.

The Data Acquisition stage 1210 retrieves uplink interference information (such as uplink interference counters) of a focus cell $C_f$ and respective downlink power information (such as downlink power counters) of all co-sited source cells Cs from the Short Term DB 1202, the OSS 1206, or combinations thereof.

The Signal Generation stage 1212 constructs an Uplink Interference Measurement (UIM) signal for one or more nonlinearity orders n and a focus cell $C_f$ using the retrieved information corresponding to uplink interference of the focus cell $C_f$, and constructs a set of Weighted Downlink Power ($WDP_i$) signals from the respective downlink power information of the co-sited cells and the set of potential PIM-contributing mixing products $IM_n(C)$ from the Long Term DB 1204. The analysis is performed on a per-order basis, that is, analysis results are obtained for nonlinearity of order 2, then a different analysis is performed for nonlinearities of order 3, and so on.

The Linear Model Analysis stage 1214 generates, using regression techniques, a set of piece-wise linear models (one linear model for each $WDP_i$ signal) for each of the data sets $\{WDP_i, UIM\}$.

The PIM Detection Assessment (PIMDA) stage 1216 computes a PIMDA score ρ according to key features obtained from the linear models generated by the Linear Model Analysis stage 1214. A large PIMDA score (i.e., for PIMDA scores having a range of 0 to 1, a PIMDA score ρ near 1) indicates a higher likelihood that the measured uplink interference was caused by PIM.

The Decision Stage 1218 evaluates a PIMDA score ρ to determine whether the PIMDA score ρ is large enough to generate a PIM interference alert.

Figure 13:
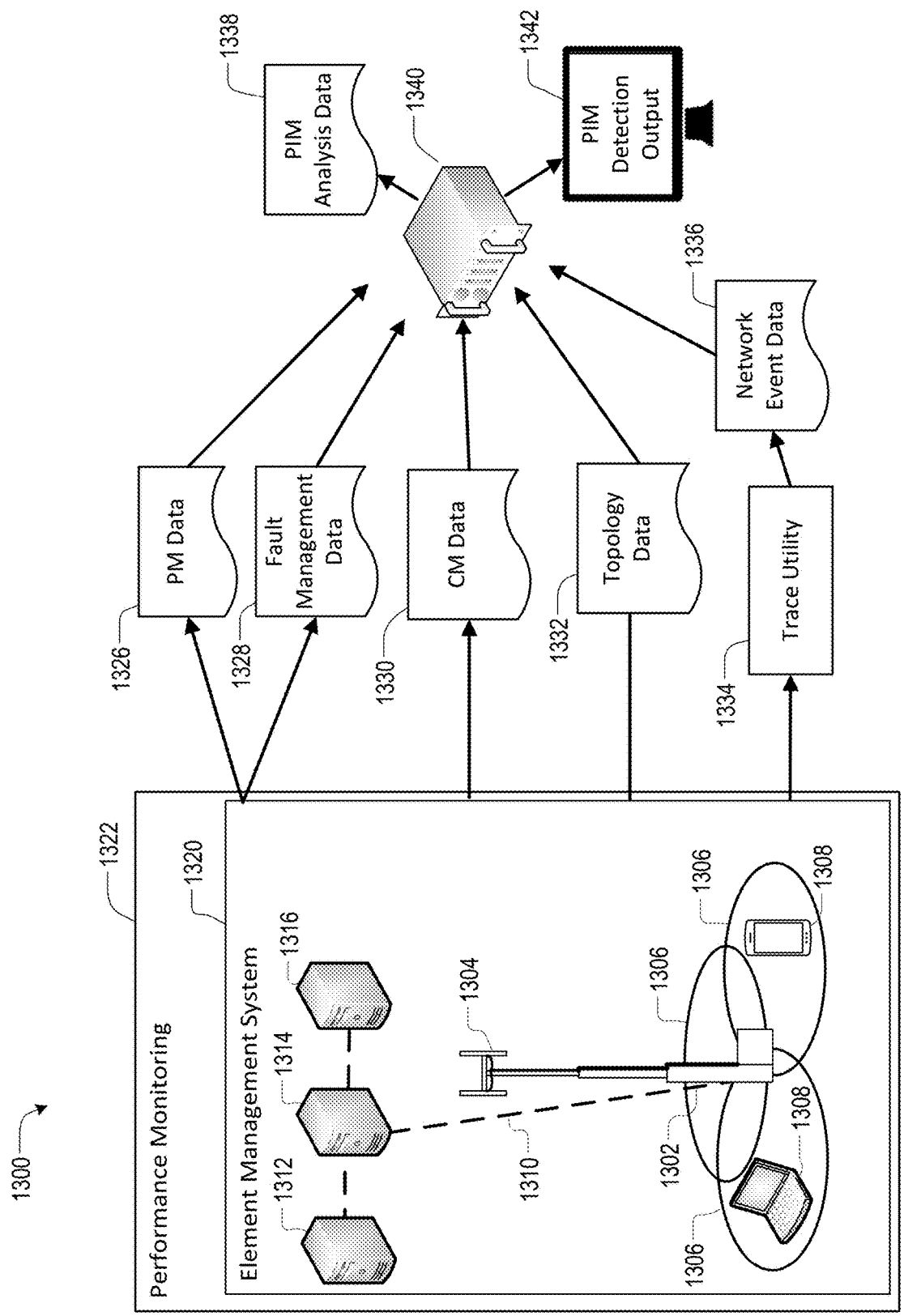
FIG. 13 illustrates a networked PIM-caused interference detection system according to an embodiment.

FIG. 13 illustrates a networked PIM-caused interference detection system 1300 according to an embodiment. The system 1300 integrates information from available wireless network sources to detect radio frequency interference generated by PIM in the context of a wireless network. Sources of this information, which are hardware elements of a wireless network, are available in typical wireless cellular networks, but may not be connected and configured in the manner suggested by this disclosure. In particular, a spectrum analytics server 1340 according to an embodiment may be a novel component of a telecommunications network.

A radio access portion of system 1300 may include one or more base stations 1302, each of which are equipped with one or more antennas 1304. Each of the antennas 1304 provides wireless communication for user equipment 1308 in one or more cells 1306. As used herein, the term "base station" refers to a wireless communications station that serves as a hub of a wireless network. For example, in a Long Term Evolution (LTE) cellular network, a base station 1302 may be an eNodeB.

A base station 1302 may correspond to the installation 10 of FIG. 1. An antenna 1304 may correspond to one of antennas 116A, 116B, or 118 of FIG. 1.

The base stations 1302 may provide service for macrocells, microcells, picocells, or femtocells 1306. FIG. 13 shows an embodiment in which base station 1302 provides wireless communication services to three cells 1306. The cells may be specific to a particular Radio Access Technology (RAT) such as GSM, UMTS, LTE, NR, etc.

Due to the directionality of some RF antennas 1304, each base station 1302 may serve a plurality of cells 1306 arrayed about the base station site. In a typical deployment, a base station 1302 provides three to six cells 1306, which are deployed in a sectorized fashion at a site. In other embodiments, one or more base station 1302 may be outfitted with an omnidirectional antenna that provides service to a single cell for a given RAT.

Multiple base stations 1302 may be present at a site and each base station may support one or more cellular communications technologies (e.g., a base station may support UMTS and LTE cells). The one or more UE 1308 may include cell phone devices, laptop computers, handheld gaming units, electronic book devices and tablet PCs, and any other type of common portable wireless computing device that are provided with wireless communications services by a base station 1302.

The system 1300 may include a backhaul portion 1310 that can facilitate distributed network communications between core elements 1312, 1314 and 1316 and one or more base station 1302 within a cellular network. In an embodiment, the backhaul portion of the network includes intermediate links between a backbone of the network which is generally wire line, and sub-networks or base stations 1302 located at the periphery of the network. The network connection between any of the base stations 1302 and the rest of the world may initiate with a link to the backhaul portion of a provider's communications network. A backhaul 1310 may include an X2 connection through which base stations 1302 communicate with one another directly.

The core network devices 1312, 1314 and 1316 may be any of a plurality of network equipment such as a Radio Resource Manager (RRM), a Mobility Management Entity (MME), a serving gateway (S-GW), a Radio Network Controller (RNC), a base station controller (BSC), a mobile switching center (MSC), a Self-Organizing Network (SON) server, an Evolved Serving Mobile Location Server (eS-MLC), a Home Subscriber Server (HSS), etc. Persons of skill in the art will recognize that core network devices 1312, 1314 and 1316 are different depending on the particular RAT or set of RATs that are present in the network. The core network devices support a radio access portion of the network that includes the base stations 1302.

Elements of the communications network 1300 are part of an Element Management System (EMS) 1320 and a Performance Monitoring (PM) system 1322. The PM system 1322 may include base stations 1306 as well as core network equipment that collect and process performance data and performance metrics for the network. A spectrum analytics server 1340 interfaces with various network components, including components of the PM system 1322 and the EMS 1320.

Although FIG. 13 shows the spectrum analytics server 1340 as a single, discrete component, embodiments are not so limited. For example, in other embodiments, components of the spectrum analytics server 1340 may be distributed among multiple computing entities. In addition, hardware for the spectrum analytics server 1340 may perform processes not directly related to detection of PIM-caused interference.

The performance monitoring system 1322 generates performance data 1326 for the wireless network. The PM data 1326 may be derived from observations of network performance, which may be reported at a predetermined time interval, e.g., every minute, 5 minutes, 15 minutes, hourly or daily. PM data 1326 may include raw event counts (e.g. counts of dropped calls or handover failures during the observation period) or complex derived performance indicators (e.g. noise rise normalized by user loading, Channel Quality Indicator (CQI) distribution statistics normalized by data volume, downlink power information, uplink interference information, etc.). PM data 1326 may include raw or aggregated performance data.

In some embodiments, PM data 1326 includes data input from a dedicated PM tool, as well as data received directly from EMS 1320, or elements of the Operations and Support System (OSS). In an embodiment, PM data 1326 may be derived directly from network event data by the spectrum analytics server 1340. For example, in an embodiment, when event data 1336 is available to the spectrum analytics server 1340, the server may aggregate individual events to create equivalent PM counters and Key Performance Indicators (KPIs). Thus, in some embodiments, PM data 1326 is derived from sources other than a PM system 1322.

Fault Management Data 1328 may be transmitted from the PM system 1322 to spectrum analytics server 1340. Fault Management Data 1328 includes, for example, alarm data that indicates performance issues at one or more cell site.

Configuration Management (CM) data 1330 is input to the spectrum analytics server 1340 from EMS 1320. CM data 1330 includes the current configuration of various wireless network equipment, such as the configuration of base stations 1302 and core components such as Radio Network Controllers.

CM Data 1330 is quasi-static and typically only updated as a result of network optimization such as cell splitting, cell ID reassignment, changes in operating frequency or transmit power, etc. CM data 1330 may include pertinent information such as cell technology (e.g., 2G GSM, 3G UMTS, 4G LTE, 5G NR) associated with physical and logical network elements, operating frequency, transmit power, reuse codes, type of cell (e.g. macro, micro, pico cell), and other information related to the configuration of the radio network elements.

Topology data 1332 is data relating to the location and orientation of network elements, including information such as the antenna latitude and longitude of a base station 1302, antenna height, pointing angle for sectorized antennas, antenna beamwidth, site deployment type (e.g. indoor, outdoor, distributed antenna system, etc.), etc. In addition to interference detection and characterization, topology data 1332 may be used to aid in correlating PM data 1326 and network event data 1336 against actual physical locations, and for understanding physical distance relationships between network elements.

Network event data 1336 represents discrete network events that are typically logged by network elements. Network event data 1336 may include information pertaining to the start and termination of phone calls, information regarding handover of UEs 1308 between network cells 1306, measurement reports sent by UEs to network elements, as well as periodic reporting at intervals of as low as several seconds or less between reporting periods. Network event data 1336 may be available via a continuous streaming mechanism, or recorded and stored in files at network elements that contain, for example, fifteen to thirty minutes or more of network event data. Because event data 1336 is reported at intervals of a few seconds, it can be used to determine variance of conditions over time at relatively short intervals, such as five minutes, one minute, 30 seconds, or as low as the reporting interval, which may be less than one second.

Network event data 1336 includes call event data, or cell trace data according to LTE terminology. Call trace data includes information identifying makes and models of UEs 1308, and is typically used by operators to determine device-specific network faults, e.g. that a particular cell phone model has an unusual rate of handover failures under certain conditions. Examples of call event data 1336 include tracking area messages, request for retries, RSSI measurements, and protocol messages. Network event data 1336 is not conventionally used for interference detection, characterization, or localization.

Tools supporting the collection of network event 1336 data may be configured to collect selected event types, or to subsample the messaging to a subset of active users. Smaller size network event files are useful in measuring implied loading on network data transport such as wireless base station backhaul. When properly configured, network events provide high resolution and near real-time information regarding the operation of targeted network base stations 1302, which can be used as part of the interference detection processes described by this disclosure.

The collection point for network event data 1336 varies between specific wireless technologies and may vary in vendor-specific implementations. For instance, network event data 1336 is typically collected at the RNC entity in 3GPP defined 3G networks (i.e., UMTS, HSPA), but network event data 1336 is collected by the eNodeB entity in 4G LTE systems. Network event recordings may be pulled directly from the network elements that store the events by the spectrum analytics server 1340, or automatically stored on a separate data storage server, or staging server, such that external systems such as the spectrum analytics server 1340 may access network event data 1336 without incurring additional data loading on the network elements. Accordingly, it should be understood that network event data 1336 may be collected, stored, and retrieved in various ways in different embodiments.

The network event data 1336 may be collected by a trace utility 1334 that is integrated with a cellular network. Trace concepts and requirements are explained, for example, in the Third Generation Partnership Project (3GPP) Technical Specification TS 32.421.

An embodiment may use network event data 1336. In such an embodiment, PIM interference detection does not use input from a dedicated Performance Monitoring system 1322, but may derive base station performance indicators directly from network event data 1336. In such an embodiment, network event data records may be aggregated.

Embodiments of this disclosure may utilize additional information sources beyond the sources illustrated in FIG. 13, such as information provided by SON (Self Organizing Network) tools, including analysis and insight into neighbor relationships not readily apparent from the sources listed above. Additional external integrations may also include radio frequency propagation planning tools that may be used to enhance accuracy of interference detection and interference localization.

The spectrum analytics server 1340 represents a specific processing device that interfaces with one or more of the external data sources described above. The spectrum analytics server 1340 may perform one or more of the processes described in this disclosure. In an embodiment, the spectrum analytics server 1340 is physically located in an operator's Network Operations Center (NOC). From a logical perspective, the spectrum analytics server 1340 is located in the Operations Support System (OSS) plane.

In an embodiment, the spectrum analytics server 1340 may perform detection of PIM-caused interference using one or more processes selected from the set comprising the process 700 of FIG. 7, the process 812 of FIG. 8, and the process 926 of FIG. 9.

In an embodiment, the spectrum analytics server 1340 is incorporated into a performance monitoring system such as the performance monitoring system 140 of FIG. 1.

In an embodiment, the spectrum analytics server 1340 may include the Short Term DB 1202 of FIG. 12, the Long Term DB 1204 of FIG. 12, or both. In an embodiment, the spectrum analytics server 1340 may be configured to perform of or more of the stages 1208, 1210, 1212, 1214, 1216, and 128 of the system 1200 of disclosed in FIG. 12.

In an embodiment, the spectrum analytics server 1340 produced PIM analysis data 1338 that may be archived or reported supervisory personnel. The PIM analysis data 1338 may include one or more PIMDA scores, one or more factors used in generating PIMDA scores, or both, among other information.

In an embodiment, the spectrum analytics server 1340 may produce a PIM Detection Output 1342 on an output device in response to determining that an amount of PIM-caused interference is more than an allowed amount, in order to notify supervisory personnel of a potential need to perform maintenance or repair activity at a base station.

Many modern wireless networks utilize shared cells sites where two or more network operators are co-located at the same physical cell site premises and typically share the same cell tower to mount their antennas. In these shared cell site deployments, PIM products may be generated by either the equipment owned and maintained by an operator experiencing PIM related problems, or the root cause of the interference may be transmitters owned and operated by other network operators sharing the common cell site. In many cases a combination of transmitting equipment spanning two or more operators leads to PIM products that impact one or more wireless receivers, and transmissions from one operator can cause PIM interference that affects a receiver of a different operator.

Figure 14:
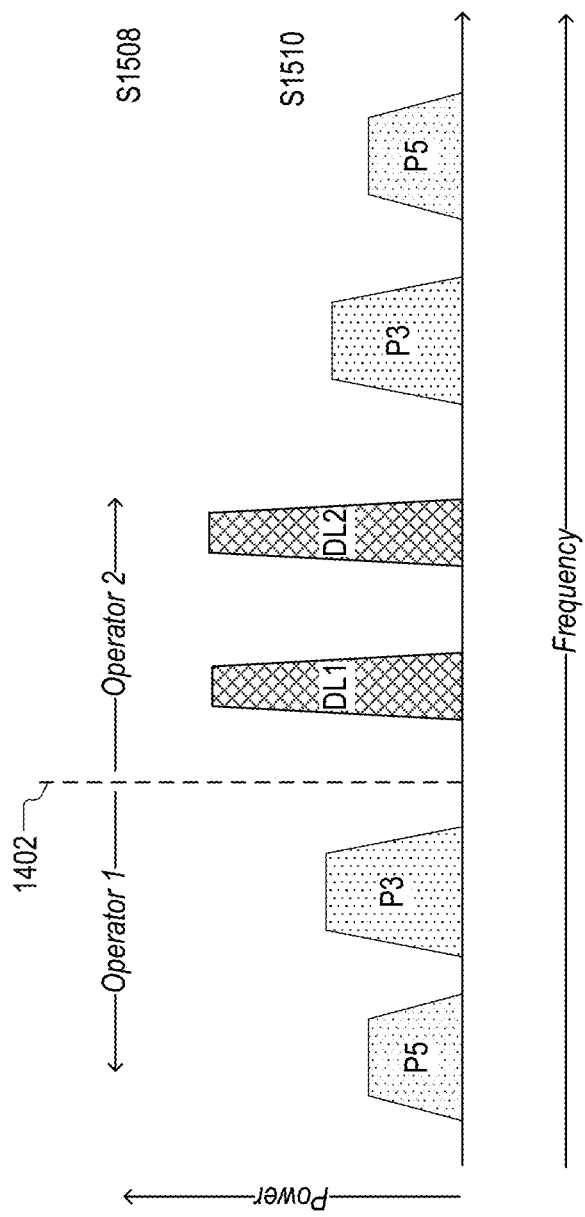
FIG. 14 illustrates PIM-caused interference that occurs in two separate networks.

FIG. 14 illustrates a situation in which transmissions from a first operator cause interference to a second operator. Line 1402 represents a point at which frequencies are divided between the first and second operators. Frequencies that are below frequency 1402 are licensed to a first operator, which frequencies above frequency 1404 are licensed to a second operator. Although FIG. 14 illustrates an embodiment in which the frequencies for two operators are adjacent to one another, it is common for the licensed frequencies of two co-sited operators to be separated by a gap.

When Operator 2 transmits downlink signals DL1 and DL2, those transmissions cause PIM third order products P3 and fifth order products P5. While some of the products are in frequencies licensed to the second operator, other products are in frequencies licensed to the first operator. Accordingly, FIG. 14 illustrates a scenario in which transmissions from one operator cause interference to frequencies that are licensed to another operator. In other examples, downlink transmissions from different operators combine to create PIM products that affect at least one of the operators.

It is difficult to detect PIM products in TDD systems using a cellular antenna since the cellular antenna is only transmitting or receiving the same frequencies at any given point in time. However, transmissions from an operator that uses a TDD system can cause PIM products that affect another operator's co-sited equipment. For example, transmissions from a TDD system can cause PIM products in frequencies dedicated to reception by another operator that operates an FDD system. In another scenario, a first operator's TDD transmissions are out of synchronization with TDD systems of other co-sited operators, so that transmissions from the first operator during a transmission mode cause PIM products that are detected by the second operator during its reception mode.

Embodiments are directed to a system and method for sharing data between different operators that operate co-sited cellular base stations. In conventional systems, network performance data, and to some extent network configuration data, is not shared between network operations teams. Network performance data is often treated as a trade secret as it may reveal strengths and weaknesses of an operator's network. Performance data such as excessive call failures or statistically low data throughput rates that could be leveraged by competitors.

In an embodiment of the present disclosure, detection of interference in shared cell site deployments may utilize configuration and real-time network performance data from all equipment housed at the shared site to detect the presence of interference external to the network. However, network performance data, and to some extent network configuration data, is not generally shared between different network operations teams that are typically in commercial competition with one another.

External interference refers to interference that is not caused by regularly scheduled transmissions by an operator. An operator's regular scheduled transmissions, such as normal uplink and downlink transmissions between a base station and UE, are internal interference, which is handled by pre-existing processes such as inter cell interference coordination (ICIC). In contrast, external interference is commonly caused by foreign sources such as a sparking transformer and a rogue transmitter. PIM interference is a form of external interference.

Figure 15:
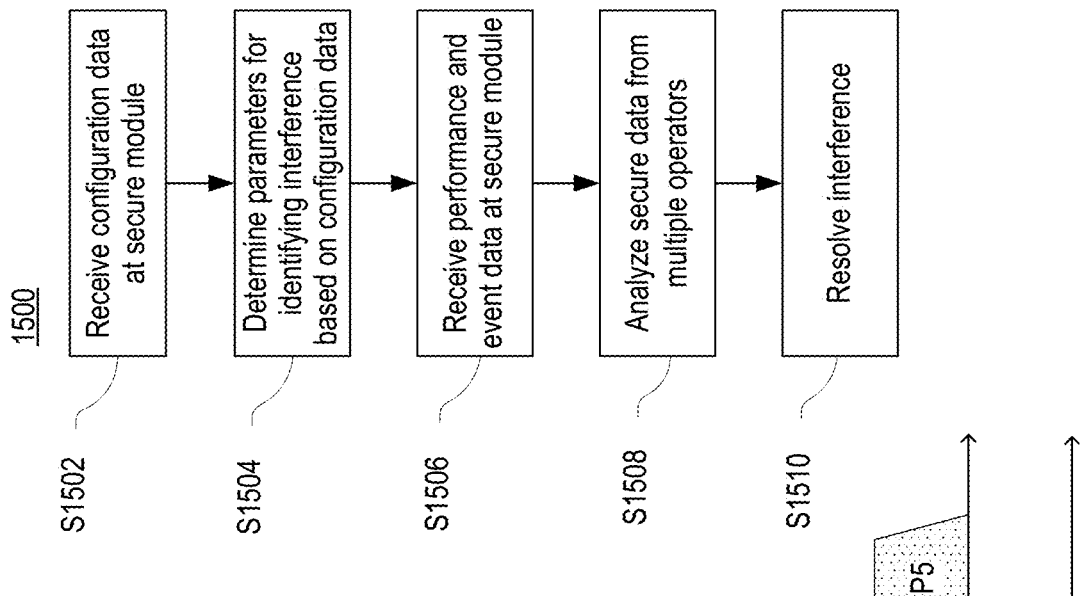
FIG. 15 illustrates an embodiment of a process for detecting external interference using data from at least two operators.

FIG. 15 illustrates an embodiment of a process for detecting external interference using data from at least two operators. The process may initiate at S1502 by receiving network configuration data at a secure module. The network configuration data may be received on system initialization, and updated when changes are made to the network configuration.

In an embodiment, network configuration data describes the physical arrangement and radio frequency channel provisioning of the wireless network. For example, network configuration data may include network topology information such as the geographical location of cell sites, the antenna pointing angles of all cells within a given cell site, the technology utilized by each cell site transceiver (e.g. GSM, UMTS, LTE, etc.) and the specific frequency channels used by each cell for transmission and reception along with associated information such as occupied channel bandwidth (e.g. 10 MHz, vs 20 MHz LTE).

Figure 16:
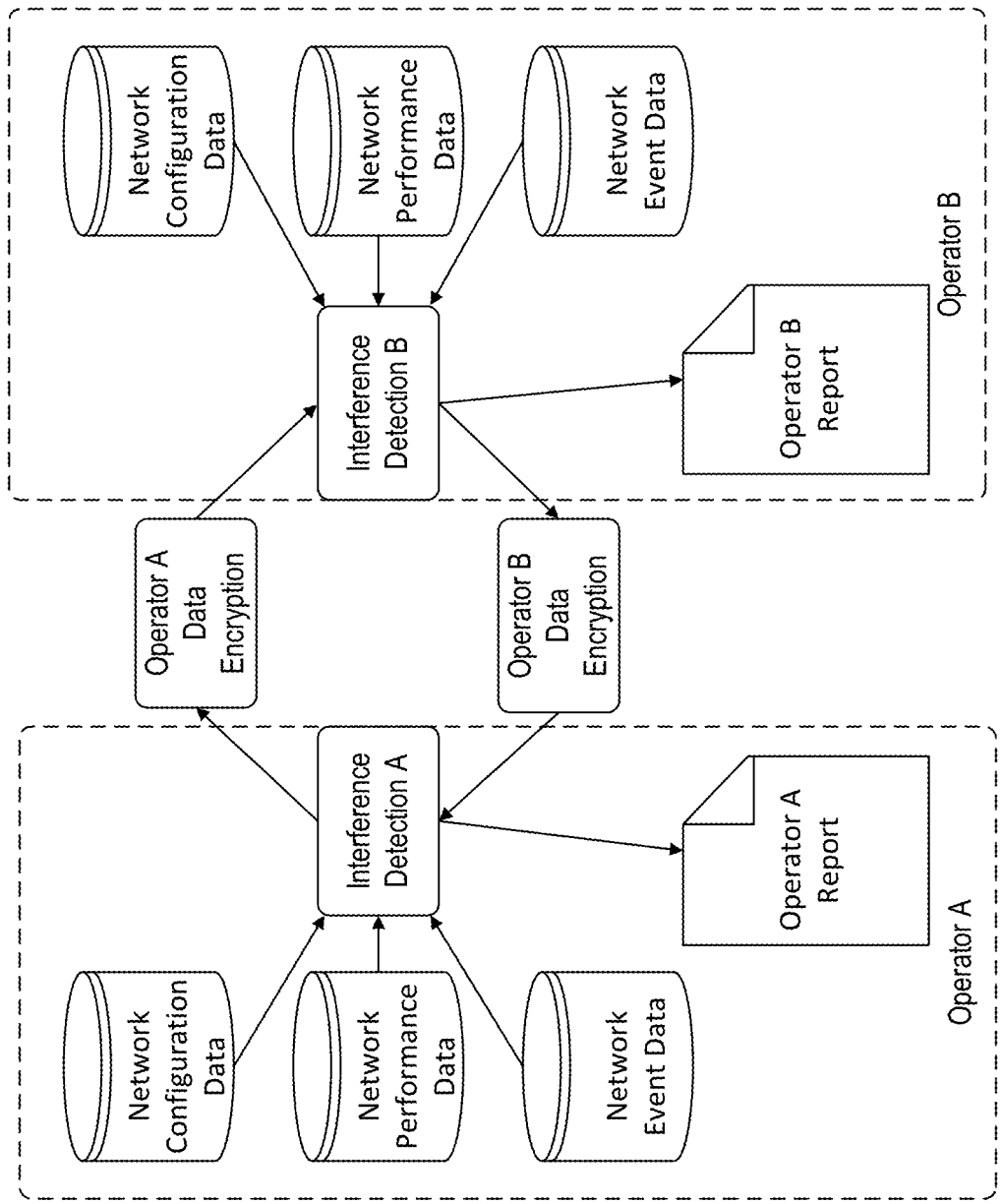
FIG. 16 illustrates a first embodiment of a system for using data from multiple network operators to determine the presence of external interference in a wireless communications network.

FIG. 16 illustrates a first embodiment of a system for using data from multiple network operators to determine the presence of external interference in a wireless communications network. In the system of FIG. 16, an operator exchanges information with another operator and independently performs interference detection. Only two operators are illustrated in FIG. 16 for the sake of simplicity, but the number of operators that can cooperate to detect external interference is not limited.

In the first embodiment, Interference Detection A, which is an interference detection module controlled by Operator A, receives network configuration data for operator A's system. The network configuration data may be received from an internal system such as a configuration management server or input manually by the operator.

In addition, Operator A's interference detection module receives network configuration data from Operator B. The data received from competing operators is protected so that it cannot be disseminated by any other operator. For example, exchanged data may be encrypted using an encryption key that is not available to any competing operators. In such an embodiment, the decryption key is retained by the interference detection so that it is not available to public scrutiny. In an embodiment, at least a portion of a decryption key has a hardware component, e.g. a particular circuit on a field programmable gate array (FPGA), an application specific integrated circuit (ASIC), or a plug-in device such as a memory device that interfaces with an interference detection module through a universal serial bus (USB).

In an embodiment, the interference detection modules are programmed during installation to carry the correct decryption keys such that they can utilize the network data from cell sharing partners, but this data is not available for human inspection or display without the consent of the cell sharing partner.

The first embodiment of FIG. 16 is not limited to using any particular interference detection module for any operator. In some embodiments, each sharing partner uses their own interference detection technology, and that interference detection technology benefits from operational information from multiple operators.

Figure 17:
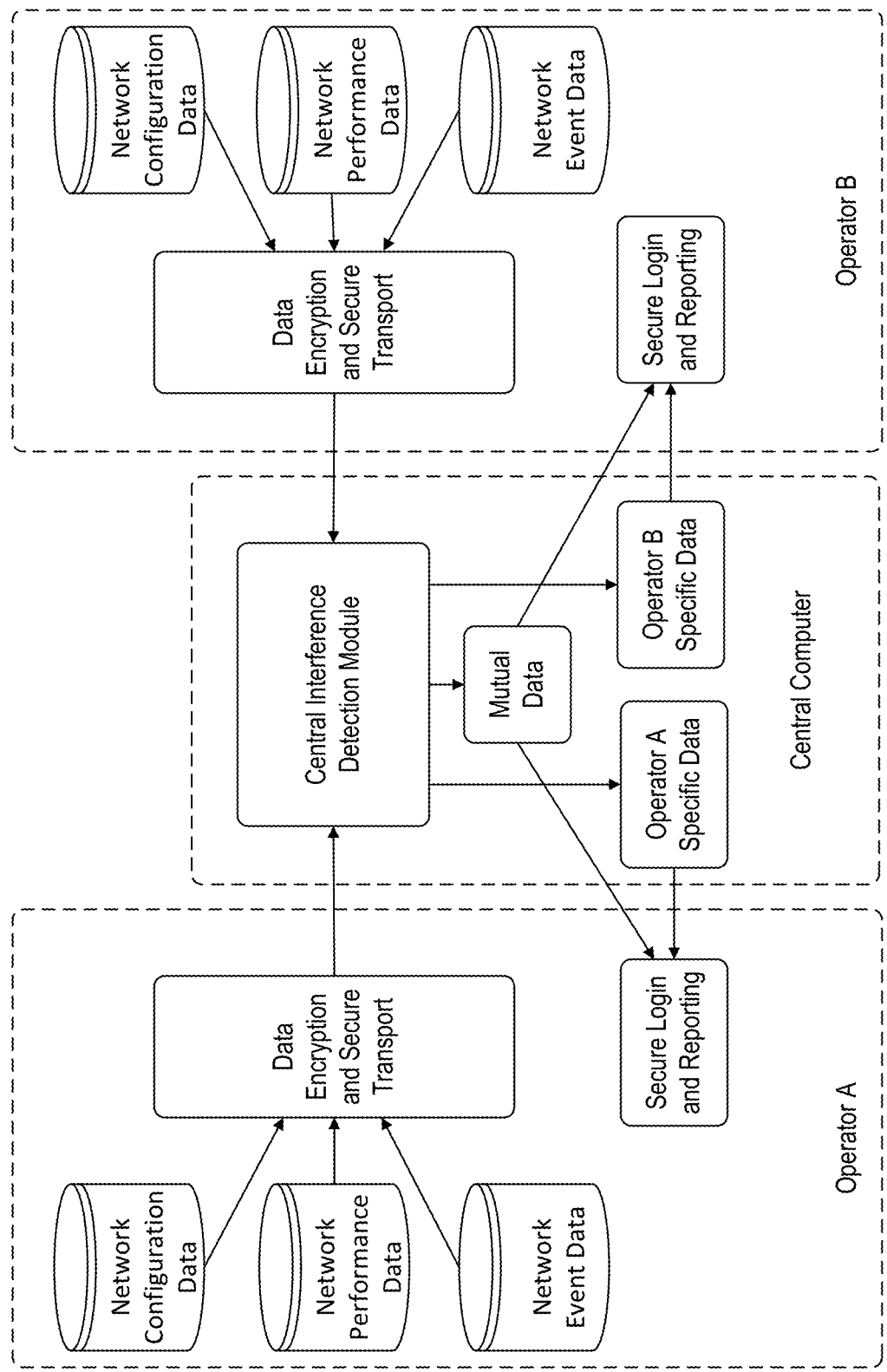
FIG. 17 illustrates a second embodiment of a system for using data from multiple network operators to determine the presence of external interference in a wireless communications network.

A second embodiment of a system for using data from multiple network operators to determine the presence of external interference in a wireless communications network is shown in FIG. 17. In the second embodiment, two or more operators provide encrypted network data to a central computer that is not controlled by any of the operators.

Operators may be reluctant to provide proprietary data to a competing operator, so the interference detection module may be provided by and/or controlled by a third party. In some embodiments, computing hardware that runs an interference detection module is provided by the third party. The hardware component may be in a location that is not under the exclusive control of either operator, such as the cell site for the co-sited operations that are being analyzed to detect interference.

In an embodiment, a central interference detection module is hosted by a third party that provides remote computing services. For example, the central interference detection module may be administered by a cloud computing service provider, and encrypted network information may be provided to the module over the Internet. In some embodiments, information is conveyed using one or more secure transport technology.

The centralized PIM detection module may be pre-provisioned with each participating operator's encryption keys, and be capable of ingesting and analyzing the network data to identify external interference. Each operator may access the shared PIM detection device and view:

PIM detection results that do not expose raw network configuration or performance data. This output data from the interference detection module may be available in a common format to all operators supported by the device per licensing agreements.

Network performance data unique to the operator in question and accessed via unique operator log in codes (e.g. the same or similar codes used to originally encrypt the proprietary data).

This common processing approach can be extended to multiple operators in an interference detection system.

After the network configuration data from S1502 is received, it is used to determine parameters for detecting interference at S1504. For example, when detecting PIM interference, the interference detection module uses the network configuration data to determine which frequencies are used by each operator for uplink and downlink transmissions. When determining whether PIM interference is present, these frequencies can be used to determine which transmissions are expected to generate PIM interference, and which frequencies to analyze for evidence of intermodulation products. In other embodiments, uplink frequencies may be catalogued to support identifying interference patterns.

Network performance data and event data is received by the interference detection system at S1506. The network performance data and event data may be received by the system on an ongoing basis at regular reporting intervals, and used to detect sub-performing cells and to direct further analysis for potential external interference.

Managed wireless network equipment typically provides periodic performance data reports depicting overall network performance over time periods on the order of 15 minutes to an hour or more. Over each reporting period information such as signal strengths, dropped call tallies, transmit and received data rates for each network cell are reported. The performance data may be transmitted by each operator to an interference detection system on an ongoing basis as it is collected.

Network event data may be high resolution time-series data provided by network cells. Network event data may be collected at a resolution of 1 minute to several seconds, and may be received by an interference detection system according to the reporting interval, or on some other periodic basis. Network event data may include non-periodic events such as information regarding the arrival of new calls, or network events as they happen such as dropped calls or failed handovers.

Network event data is utilized by some interference detection modules to investigate interference events on finer time scales than is possible via the summary network performance data described above.

The data collected by an interference detection module is analyzed to determine whether external interference is present at S1508. For the detection of PIM interference, analyzing the data may include detecting interference products as described above in the present disclosure. However, embodiments are not limited to PIM detection alone. In other embodiments, the presence of other types of interference may be detected.

For example, interference may extend across a portion of spectrum that extends beyond the uplink frequencies of one operator for a particular cell. In such a case, an interference detection module can analyze a relatively broad spectrum that includes frequencies of all operators that contribute data to the detection module. In some embodiments, the shared data can be used to increase the resolution of an interference localization process.

In an embodiment, UE reports may be used to pinpoint a source of broadband interference. Such an embodiment could utilize data from UE reports from multiple operators to increase the accuracy of a localization process. Similarly, the system described by this disclosure may be used to improve the results of network processes besides interference detection.

Interference detected by the detection module may be resolved by an operator at S1510. Examples of resolving interference may include one or more of:
  deploying personnel to identify and resolve a cause of the interference,
  characterizing interference by one or more of time, frequency and location in a report provided to an operator,
  adapting parameters of one or more cellular antenna to reduce the effects of interference on the network,
  contacting an entity in control of a source of interference, e.g. a sparking transformer, to engage the controlling entity in an effort to eliminate the source of interference, and
  determining a probable source of interference, e.g. a rogue transmitter or radar installation, and providing the probable source to an operator.

PIM interference is typically caused by a faulty connector in an RF signal path or by reflections off of a corroded surface, so resolving PIM interference may include repairing an RF cable connection in a signal path of a receiver, removing oxidation from a component of the receiver, or reducing the effect of a nonlinearity that causes PIM product reflections. The effect of the nonlinearity can be reduced, for example, by removing corrosion or oxidation from a surface or applying shielding to the surface.

In some embodiments, the accuracy of PIM interference detection can be enhanced by performing additional processes to characterize interference detected by a cellular network. Interference that is detected by the network may be analyzed to determine whether the interference has characteristics suggesting that it is not associated with PIM.

For example, an initial data analysis cycle may be carried out to detect interference events that are observed by multiple geographically separated cell sites with a high level of correlation to the time series magnitude of the detected interference event.

As seen in FIG. 18, a PIM detection system may be configured in a process 1800 that includes determining parameters of cellular receivers at S1802. Some of the parameters that may be determined here are a location of a receiver, e.g. a set of geographic coordinates, a type or physical configuration of the receiver, and which channels, or frequencies, the receiver is configured to receive in. The parameters may be retrieved from a configuration management server or input manually.

Cellular networks experience PIM interference in two primary forms. The first form is caused by nonlinearities in physical cellular equipment, such as a poor contact junction (e.g. junctions 114A and 114B of FIG. 1) or a corroded ground strap. This form of PIM may be referred to as conductive PIM.

There are several different varieties of cellular receivers. eNodeB macro cells typically have a single physical receiver service to a cell, and three receivers are typically mounted on a single cell tower. In enclosed spaces such as a tunnel in a highway and building interiors, a receiver may be in the form of a leaky cable that extends over a long distance. In areas such as stadiums and large arenas, a single cell may be associated with a distributed network of receive antennas that share a common signal path. For purposes of the present disclosure, a receiver refers to the physical structure that receives cellular RF transmissions and shares an RF signal path for one or more channel of a cell, even if multiple receive antennas are involved.

The second form of PIM interference occurs when radio waves from a transmitter reflect off a nonlinearity, e.g. the corroded area 120c of FIG. 1. This form of PIM may be referred to as radiative PIM. While radiative PIM can affect a plurality of receivers in proximity to the reflections, conductive PIM generally affects a single receiver. However, signal strength of the reflections is relatively low, and may fall below the noise floor after travelling about 10 meters.

For each receiver in a network, nearby neighbors may be determined at S1804. Here, the nearby neighbors are neighbors that could be affected by the same radiative PIM as a target receiver. Accordingly, the near neighbors may be all receivers within a predetermined distance of the target receiver, e.g. all receivers within 20 meters. Because radiative PIM rapidly decays, PIM artifacts are not expected to affect receivers that are more than 10 meters from a nonlinearity that causes PIM interference, so a distance of 20 meters accounts for a case in which two receivers are equidistantly separated from a reflecting nonlinearity. In some embodiments, other distance values may be used to determine near neighbors, such as 15 meters and 10 meters.

Far neighbors of a target receiver may be determined at S1806. Determining far neighbors may include determining receivers that are located at multiple tiers of distance, e.g. receivers that are within one kilometer and receivers that are within 10 kilometers. These groups may be used to determine whether interference patterns are present over a large area—if interference is highly correlated for all receivers in a 10 kilometer radius, the interference is not likely to be associated with PIM. Far neighbors may be all receivers that are not near neighbors. In specific embodiments, far neighbors may be receivers that are separated by a minimum distance of 10 meters, 20 meters, 100 meters, etc.

In some embodiments, neighbors of a target receiver are receivers that receive on at least one frequency or channel as the target receiver. However, receivers that receive in other channels may be considered as neighbors, e.g. to determine whether broadband interference is present. In some embodiments, all neighbor receivers that are not classified as near neighbors are classified as far neighbors, and a system may determine individual distances from a target receiver to each respective far neighbor. Information gathered by process 1800 is recorded in a PIM detection system at S1808, e.g. by recording associated data in a computer memory.

Because receiver parameters tend to remain constant for extended periods of time, process 1800 may be performed once when a PIM detection system is established, and then elements of the process may be updated when receiver parameters change. In other embodiments, process 1800 may be performed on a periodic basis, or when new equipment is installed in a network.

After a PIM detection system has been configured by process 1800, it may be used to determine whether PIM interference is present in a cellular network in a process 1900.

Interference is detected at S1902. In cellular networks, interference measurements are made automatically at predetermined intervals and reported in performance metrics such as a signal to interference ratio (SIR), a signal to interference plus noise ratio, (SINR), carrier-to-noise ratio (CIR), etc. Accordingly, an embodiment may include capturing interference-related metrics for respective receivers from a network's performance monitoring (PM) system. Embodiments may capture PM data, Event data, and Alarm data as interference data to determine whether interference is affecting a receiver.

Interference detected by receivers may be correlated at S1904 to determine whether interference detected at multiple receivers correlates in one or more of time, frequency and magnitude. In an embodiment, the correlations may be categorized according to a probability that they are associated with PIM.

In an embodiment, correlations are performed for receivers that are separated by a distance at which radiative PIM would not be detected, e.g. receivers that are determined to be far neighbors at S1806. Interference that is highly correlated between far neighbors is not likely to be associated with reflective PIM. Similarly, interference that is detected by a single receiver and is not correlated to any of the receiver's nearby neighbors is suggestive of conductive PIM interference, while interference that is highly correlated to close neighbor receivers but not correlated to far neighbor receivers may indicate radiative PIM interference. Therefore, multiple correlations may be performed between a target cell and its near and far neighbors at S1904.

In an embodiment, an interference detection system records one or more set of correlated receivers from S1904 in one or more multi-receiver event list 1920. In one embodiment, sets of receivers with interference that is correlated in dimensions such as time and frequency are combined into a single event list 1920 based on the strength of correlations. For example, correlations that are higher than a threshold value may be placed on the list 1920. The threshold value may be, for example, 0.50, 0.75, 0.90, etc. If the only receivers in a set of correlated receivers are near neighbors, then those receivers may not be designated as a set of correlated receivers in the event list 1920.

Each of the detected multi-site events may be broken down into short duration time intervals to create time-series activity data 1930 at S1906. The time intervals may be limited by the time resolution of the interference detection processes of a network. For example, the time intervals may have 15 minute time resolution for detection based on 15 minute network performance data or 1 minute time resolution for detection based on 1 minute network event data.

Receivers may be grouped for each correlation that suggests a source of interference other than PIM. An example of these groupings can be seen in list 1920, which show two groups of receivers (ABC and XYZ) that are each correlated with a different interference event.

An activity flag may be set for each time interval for the correlated groups. FIG. 19 shows an embodiment of activity data 1930 with a binary activity indicator, which may indicate whether an event that established a correlated group has been detected at a level that exceeds a predetermined threshold for each time slot. The threshold may be based on one or more factors chosen from the magnitude of interference, a number of interference measurements in which interference was detected within a time period, a correlation value between one or more of the cells, etc.

Although activity data 1930 in the figure only shows binary activity data, or data that is weighted at 1 or 0, other embodiments are possible. Interference detection and determination can be affected by a number of variables, and it is not always clear whether interference is definitively caused by something other than PIM. Even when interference that is not caused by PIM is detected at a receiver, the receiver may still be experiencing interference caused by PIM in addition to the other source of interference. Therefore, in some embodiments, a weighting value is assigned to time slots in which correlated interference is present for each correlated group at S1908. The weighting value may be a value between 0 and 1, and may be applied, e.g. to the PIMDA score $\rho$ discussed above for each respective time slot. Such an embodiment may identify PIM interference at a receiver with a high PIDMA score even when the receiver is being affected by interference that is correlated with multiple receivers.

Persons of skill in the art will understand that various weighting schemes are possible. For example, a weighting value may be applied to a group of receivers based on one or both of a frequency correlation score and a time correlation score. A non-exhaustive list of other values that could affect a weighting score includes a number of receivers in the group, a distance between receivers, e.g. a maximum, median or mean distance, a number of samples in a time period in which correlated interference is detected, traffic levels at one or more of the receivers, an environment in which receivers are located (e.g. industrial, urban or rural), a time of day, etc. Examples of traffic levels PIM detection may be performed for one or more receiver at S1910 in accordance with embodiments of the present disclosure.

PIM interference is a localized phenomenon impacting specific receivers that are in close proximity to powerful transmitters. Thus, interference events that are highly correlated between distant receivers cannot have PIM as their root cause.

The ability to detect true PIM events is enhanced by eliminating or reducing the weight given to time slots during which other types of interference is present. Therefore, the weighting from S1908 is applied to time slots in which correlated interference is detected when determining whether PIM interference is present at receivers in a correlated group at S1910.

FIG. 20 illustrates another embodiment of a process 2000 that can determine whether PIM interference is present in a cellular network. While process 1900 determines correlations and uses interference that is correlated between multiple receivers that are separated in space to improve PIM interference detection, process 2000 uses interference characteristics that can be detected at a target receiver. Process 2000 can be practiced in conjunction with or separate from process 1900.

Interference is detected at a target receiver at S2002, and characteristics of the interference are determined at S2004. In particular, the process may determine whether characteristics of interference detected at a target receiver suggest that the detected interference is not caused by PIM. There are several categories of these characteristics.

One such category is wideband interference that simultaneously affects multiple wideband RF channels. PIM interference which results from transmit mixing products is usually of narrower bandwidth than interference types such as industrial RFI generated by faulty machinery is often broadband, potentially spanning hundreds of MHz or more of RF spectrum. Time slots during which this type of interference is detected may be weighted less strongly or ignored completely when determining whether a receiver is affected by PIM interference.

Interference detected during times of low base station transmit activity may be similarly de-weighted or excluded during PIM detection. PIM involves mixing products of relatively high power transmit signals that fall into receiver RF channels. During times with low to no transmit activity, the likelihood of PIM is reduced or eliminated. Some interference types, such as constantly elevated receiver noise floors that do not correlate with transmitter activity, may be de-weighted or ignored for the purpose of detecting PIM events.

Another example of a characteristic that suggests interference is not caused by PIM is periodicity. Some detected interference events demonstrate highly stable repetitive nature such as interference from swept radar systems. PIM interference typically follows downlink transmitter activity. If transmitter activity in the vicinity of the cell has some periodicity (typically transmitter activity has a 24 hour periodicity or weekly periodicity), interference with periodicity not matching traffic periodicity is unlikely to be associated with PIM. If transmitter activity is not periodic, interference with high periodicity is unlikely to be associated with PIM. Therefore, in an embodiment, a system determines whether interference is detected in a periodic pattern at S2004. Persons of skill in the art will understand that various techniques for determining periodicity such as autocorrelation can be used to determine a periodicity characteristic.

Time-series activity data is created for time slots based on the non-PIM characteristics at S2006. In an embodiment, a time slot is flagged for a receiver if non-PIM activity was detected at S2004 in that time slot.

A weighting is applied to the flagged time slot at S2008. The weighting may be a binary multiplier or some other weighting value that is scaled to one or more of an amount of activity in a time slot, a degree of confidence that detected interference is not caused by PIM, a type of the detected interference, etc.

In one embodiment, a method for determining interference that is external to cellular telecommunications in a secure module that prevents a first operator that operates a first network from accessing network configuration and performance data of a second operator that operates a second network includes receiving network configuration data and network performance data for a first cell operated by a first operator, the performance data including interference measurements for frequencies licensed to the first operator, receiving network configuration data and network performance data for a second cell operated by a second operator and co-sited with the first cell, the network performance data including interference measurements for frequencies licensed to the second operator, and identifying interference external to the cellular telecommunications system that affects the first cell and the second cell using the network performance data from the first and second cells.

The method may further include receiving downlink power information of a plurality of transmitters, determining intermodulation product information for the plurality of transmitters, and using the downlink power information and the intermodulation product information to determine interference generated by passive intermodulation (PIM).

Determining the interference generated by PIM may include determining, using the intermodulation product information and the downlink power information, a Weighted Downlink Power (WDP) signal for an intermodulation product, the WDP signal including a plurality of expected power values, and determining, using the WDP signal, a PIM Detection Assessment (PIMDA) score of the intermodulation product, wherein a value of the PIMDA score corresponds to interference generated by PIM.

In an embodiment, the intermodulation product information includes information for intermodulation products that occur in uplink frequencies allocated to both of the first and second operators.

In an embodiment, the downlink power information includes information for downlink frequencies allocated to both of the first and second operators.

In an embodiment, at least one of the first cell and the second cell transmit and receive signals using time division duplexing (TDD).

In an embodiment, both of the first and second networks are TDD networks, and a time that is allocated for transmitting in the first network is allocated to receiving in the second network.

In an embodiment, determining the PIMDA score includes generating, using the WDP signal and the uplink interference information, a plurality of linear models for the intermodulation products, determining, using the linear models, a plurality of features of the intermodulation product, and determining, using the plurality of features, the PIMDA score, wherein a value of the PIMDA score corresponds to interference generated by PIM and received by the receiver. Generating the plurality of linear models may include generating a global linear model expressing a relationship between all of the expected power values of the WDP signal and the corresponding received interference values of the uplink interference information, partitioning the expected power values of the WDP signal into a plurality of segments, and generating a local linear model for each of the segments, the local linear model expressing relationships between all of the expected power values of the segment and the corresponding received interference values of the uplink interference information, wherein the segments are disjointed from each other.

An embodiment of the method further comprises determining first downlink and uplink frequencies for the first operator from the network configuration data, determining second downlink and uplink frequencies for the second operator from the network configuration data, and determining PIM products for downlink transmissions in both of the first and second uplink frequencies.

This document describes a system and a process for remote detection of PIM-caused interference in wireless networks. Embodiments of this disclosure allow operators to automatically detect the presence of PIM interference in a wireless communications network. An operator can implement embodiments to easily identify cells being impacted by PIM without resorting to service interruptions. The PIM Interference Remote Detection system may have of a long-term retention database where a set of intermodulation products is stored, and a short-term retention database in which uplink interference and downlink transmission power metrics are stored for each cell of a plurality of monitorable cells operating in a vicinity. The method then uses the information from these databases to compute a PIM Detection Assessment score that indicates the likelihood that uplink interference measurements can be attributed to PIM.

An operator can use information from embodiments of this disclosure to deploy personnel to remedy the physical cause of interference, such as replacing an oxidized connector or notifying a power company of a malfunctioning component. An operator may be a licensor of RF spectrum that operates a cellular telecommunications network.

Embodiments of the present disclosure represent improvements to cellular telecommunication technology. Embodiments can analyze and characterize interference without requiring network service interruptions, and without installing additional signal generation or energy sensing equipment in network areas.

Embodiments of the present application are directed to a novel method for detecting interference caused by PIM in cellular telecommunication networks. For example, the present disclosure provides a method by which PIM interference that is caused by transmissions in a first channel can be detected by its effects on a second channel in a different frequency from the first channel. The effects can be detected remotely by one or more computing device that interfaces with existing network equipment, thereby representing a substantial improvement over technologies that require direct measurements of signals by a portable device. Embodiments may detect interference caused by or affecting a TDD cellular system by leveraging TDD systems of co-sited cells that are out of sequence with one another, e.g. one cell is transmitting while the other cell is receiving. An embodiment may include adjusting timing of at least one cell to ensure that transmissions and receptions are adapted to detect interference. PIM detection may be further improved by excluding or de-weighting time slots in which a receiver experiences external interference that is not PIM, e.g. interference that is highly correlated across multiple distant neighbors.

Using data from multiple operators to enhance efforts for external interference detection and other automated network processes is an improvement to existing technology as well. Conventional systems only use data from a single operator, so they cannot detect, for example, intermodulation products that appear in frequencies allocated to a different operator. Commercially competing operators do not conventionally share network data, so this and other improvements associated with a broader set of data are improvements to existing technologies.

What is claimed is:
1. A method of automatically detecting PIM interference at a target receiver in a cellular network, the method comprising:
   determining a plurality of receivers in the cellular network that are separated from the target receiver by at least a minimum distance;
   receiving interference data over a time period from the plurality of receivers;
   determining correlations between interference detected by the plurality of receivers and the target receiver in the time period;
   determining at least one time slot in the time period in which the correlations exceed a predetermined value;
   applying the weighting factor to the at least one time slot; and
   determining whether PIM interference is present at the target receiver by analyzing interference at the target receiver over the time period with the at least one weighted time slot.

2. The method of claim 1, wherein the weighting factor is chosen from 1 and 0 based on a level of at least one of the correlations, and a weighting factor of 0 excludes an associated time slot from consideration when determining whether PIM interference is present at the target receiver.

3. The method of claim 1, wherein the minimum distance is greater than 0 and less than 100 meters.

4. The method of claim 1, wherein the correlations are based on at least one of periodicity, frequency, and magnitude of the detected interference.

5. The method of claim 1, further comprising:
   determining whether interference received by the target receiver in a second time slot has at least one non-PIM characteristic;
   determining a second weighting factor for the second time slot based on the at least one non-PIM characteristic; and
   applying the second weighting factor to the second time slot when determining whether PIM interference is present.

6. The method of claim 1, wherein determining whether PIM interference is present comprises:
   determining intermodulation product information for a plurality of transmitters;
   receiving downlink power information of the plurality of transmitters;
   determining, using the intermodulation product information and the downlink power information, a Weighted Downlink Power (WDP) signal for an intermodulation product, the WDP signal including a plurality of expected power values; and
   determining, using the WDP signal, a PIM Detection Assessment (PIMDA) score of the intermodulation product, wherein a value of the PIMDA score corresponds to interference generated by PIM.

7. The method of claim 1, further comprising:
   resolving the interference by repairing an RF cable connection in a signal path of the receiver, removing oxidation from a component of the receiver, or reducing the effect of a nonlinearity that causes PIM product reflections.

8. A system for automatically detecting PIM interference at a target receiver in a cellular network, the system comprising at least one non-transitory computer readable medium with computer executable instructions stored thereon which, when executed by a processor, perform the following operations:

determining a plurality of receivers in the cellular network that are separated from the target receiver by at least a minimum distance;

receiving interference data over a time period from the plurality of receivers;

determining correlations between interference detected by the plurality of receivers and the target receiver in the time period;

determining at least one time slot in the time period in which the correlations exceed a predetermined value;

applying the weighting factor to the at least one time slot; and determining whether PIM interference is present at the target receiver by analyzing interference at the target receiver over the time period with the at least one weighted time slot.

9. The system of claim 8, wherein the weighting factor is chosen from 1 and 0 based on a level of at least one of the correlations, and a weighting factor of 0 excludes an associated time slot from consideration when determining whether PIM interference is present at the target receiver.

10. The system of claim 8, wherein the minimum distance is greater than 0 and less than 100 meters.

11. The system of claim 8, wherein the correlations are based on at least one of periodicity, frequency, and magnitude of interference.

12. The system of claim 8, further comprising: determining whether interference received by the target receiver in a second time slot has at least one non-PIM characteristic; determining a second weighting factor for the second time slot based on the at least one non-PIM characteristic; and applying the second weighting factor to the second time slot when determining whether PIM interference is present.

13. The system of claim 8, wherein determining whether PIM interference is present comprises: determining intermodulation product information for a plurality of transmitters; receiving downlink power information of the plurality of transmitters; determining, using the intermodulation product information and the downlink power information, a Weighted Downlink Power (WDP) signal for an intermodulation product, the WDP signal including a plurality of expected power values; and determining, using the WDP signal, a PIM Detection Assessment (PIMDA) score of the intermodulation product, wherein a value of the PIMDA score corresponds to interference generated by PIM.

* * * * *